US012462575B2

(12) United States Patent
Emmons et al.

(10) Patent No.: US 12,462,575 B2
(45) Date of Patent: Nov. 4, 2025

(54) VISION-BASED MACHINE LEARNING MODEL FOR AUTONOMOUS DRIVING WITH ADJUSTABLE VIRTUAL CAMERA

(71) Applicant: Tesla, Inc., Austin, TX (US)

(72) Inventors: John Emmons, Austin, TX (US); Danny Hung, Austin, TX (US); Ethan Knight, Austin, TX (US); Lane McIntosh, Austin, TX (US)

(73) Assignee: Tesla, Inc., Austin, TX (US)

( * ) Notice: Subject to any disclaimer, the term of this patent is extended or adjusted under 35 U.S.C. 154(b) by 422 days.

(21) Appl. No.: 17/820,859

(22) Filed: Aug. 18, 2022

(65) Prior Publication Data

US 2023/0057509 A1 Feb. 23, 2023

Related U.S. Application Data

(60) Provisional application No. 63/365,078, filed on May 20, 2022, provisional application No. 63/287,936, (Continued)

(51) Int. Cl.
*G06V 20/58* (2022.01)
*G06N 20/00* (2019.01)

(52) U.S. Cl.
CPC ............ *G06V 20/58* (2022.01); *G06N 20/00* (2019.01)

(58) Field of Classification Search
CPC ........... G06V 20/52–588; G06N 20/00; G06N 3/02–105
See application file for complete search history.

(56) References Cited

U.S. PATENT DOCUMENTS 6,882,755 B2 4/2005 Silverstein et al.
7,209,031 B2 4/2007 Nakai et al.
(Continued)

FOREIGN PATENT DOCUMENTS

AU 2019261735 A1 6/2020
AU 2019201716 A1 10/2020
(Continued)

OTHER PUBLICATIONS

"OmniDet: Surround View Cameras Based Multi-Task Visual Perception Network for Autonomous Driving" by Varun Ravi Kumar et al. IEEE Robotics and Automation Letters, vol. 6, No. 2, Apr. 2021 (Year: 2021).*
(Continued)

*Primary Examiner* — Gregory A Morse
*Assistant Examiner* — Ty Mitchell Beatty
(74) *Attorney, Agent, or Firm* — Foley & Lardner LLP

(57) ABSTRACT

Systems and methods for a vision-based machine learning model for autonomous driving with adjustable virtual camera. An example method includes obtaining images from a multitude of image sensors positioned about a vehicle. Features associated with the images are determined, with the features being output based on a forward pass through a first portion of a machine learning model. The features are projected into a vector space associated with a virtual camera at a particular height. The projected features are aggregated with other projected features associated with prior images. A plurality of objects which are positioned according to the virtual camera are determined.

18 Claims, 10 Drawing Sheets

Related U.S. Application Data filed on Dec. 9, 2021, provisional application No. 63/260,439, filed on Aug. 19, 2021.

(56) References Cited

U.S. PATENT DOCUMENTS

| | | |
|---|---|---|
| 7,747,070 B2 | 6/2010 | Puri |
| 7,904,867 B2 | 3/2011 | Burch et al. |
| 7,974,492 B2 | 7/2011 | Nishijima |
| 8,165,380 B2 | 4/2012 | Choi et al. |
| 8,369,633 B2 | 2/2013 | Lu et al. |
| 8,406,515 B2 | 3/2013 | Cheatle et al. |
| 8,509,478 B2 | 8/2013 | Haas et al. |
| 8,588,470 B2 | 11/2013 | Rodriguez et al. |
| 8,744,174 B2 | 6/2014 | Hamada et al. |
| 8,773,498 B2 | 7/2014 | Lindbergh |
| 8,874,266 B1 | 10/2014 | Francis et al. |
| 8,912,476 B2 | 12/2014 | Fogg et al. |
| 8,913,830 B2 | 12/2014 | Sun et al. |
| 8,928,753 B2 | 1/2015 | Han et al. |
| 8,972,095 B2 | 3/2015 | Furuno et al. |
| 8,976,269 B2 | 3/2015 | Duong |
| 9,008,422 B2 | 4/2015 | Eid et al. |
| 9,081,385 B1 | 7/2015 | Ferguson et al. |
| 9,275,289 B2 | 3/2016 | Li et al. |
| 9,586,455 B2 | 3/2017 | Sugai et al. |
| 9,672,437 B2 | 6/2017 | McCarthy |
| 9,710,696 B2 | 7/2017 | Wang et al. |
| 9,738,223 B2 | 8/2017 | Zhang et al. |
| 9,754,154 B2 | 9/2017 | Craig et al. |
| 9,767,369 B2 | 9/2017 | Furman et al. |
| 9,965,865 B1 | 5/2018 | Agrawal et al. |
| 10,031,526 B1 | 7/2018 | Li et al. |
| 10,133,273 B2 | 11/2018 | Linke |
| 10,140,252 B2 | 11/2018 | Fowers et al. |
| 10,140,544 B1 | 11/2018 | Zhao et al. |
| 10,146,225 B2 | 12/2018 | Ryan |
| 10,152,655 B2 | 12/2018 | Krishnamurthy et al. |
| 10,167,800 B1 | 1/2019 | Chung et al. |
| 10,169,680 B1 | 1/2019 | Sachdeva et al. |
| 10,192,016 B2 | 1/2019 | Ng et al. |
| 10,216,189 B1 | 2/2019 | Haynes |
| 10,228,693 B2 | 3/2019 | Micks et al. |
| 10,242,293 B2 | 3/2019 | Shim et al. |
| 10,248,121 B2 | 4/2019 | VandenBerg, III |
| 10,262,218 B2 | 4/2019 | Lee et al. |
| 10,282,623 B1 | 5/2019 | Ziyaee et al. |
| 10,296,828 B2 | 5/2019 | Viswanathan |
| 10,303,961 B1 | 5/2019 | Stoffel et al. |
| 10,310,087 B2 | 6/2019 | Laddha et al. |
| 10,311,312 B2 | 6/2019 | Yu et al. |
| 10,318,848 B2 | 6/2019 | Dijkman et al. |
| 10,325,178 B1 | 6/2019 | Tang et al. |
| 10,331,974 B2 | 6/2019 | Zia et al. |
| 10,338,600 B2 | 7/2019 | Yoon et al. |
| 10,343,607 B2 | 7/2019 | Kumon et al. |
| 10,359,783 B2 | 7/2019 | Williams et al. |
| 10,366,290 B2 | 7/2019 | Wang et al. |
| 10,372,130 B1 | 8/2019 | Kaushansky et al. |
| 10,373,019 B2 | 8/2019 | Nariyambut Murali et al. |
| 10,373,026 B1 | 8/2019 | Kim et al. |
| 10,380,741 B2 | 8/2019 | Yedla et al. |
| 10,394,237 B2 | 8/2019 | Xu et al. |
| 10,395,144 B2 | 8/2019 | Zeng et al. |
| 10,402,646 B2 | 9/2019 | Klaus |
| 10,402,986 B2 | 9/2019 | Ray et al. |
| 10,414,395 B1 | 9/2019 | Sapp et al. |
| 10,423,934 B1 | 9/2019 | Zanghi et al. |
| 10,436,615 B2 | 10/2019 | Agarwal et al. |
| 10,452,905 B2 | 10/2019 | Segalovitz et al. |
| 10,460,053 B2 | 10/2019 | Olson et al. |
| 10,467,459 B2 | 11/2019 | Chen et al. |
| 10,468,008 B2 | 11/2019 | Beckman et al. |
| 10,468,062 B1 | 11/2019 | Levinson et al. |
| 10,470,510 B1 | 11/2019 | Koh et al. |
| 10,474,160 B2 | 11/2019 | Huang et al. |
| 10,474,161 B2 | 11/2019 | Huang et al. |
| 10,474,928 B2 | 11/2019 | Sivakumar et al. |
| 10,489,126 B2 | 11/2019 | Kumar et al. |
| 10,489,972 B2 | 11/2019 | Atsmon |
| 10,503,971 B1 | 12/2019 | Dang et al. |
| 10,514,711 B2 | 12/2019 | Bar-Nahum et al. |
| 10,528,824 B2 | 1/2020 | Zou |
| 10,529,078 B2 | 1/2020 | Abreu et al. |
| 10,529,088 B2 | 1/2020 | Fine et al. |
| 10,534,854 B2 | 1/2020 | Sharma et al. |
| 10,535,191 B2 | 1/2020 | Sachdeva et al. |
| 10,542,930 B1 | 1/2020 | Sanchez et al. |
| 10,546,197 B2 | 1/2020 | Shrestha et al. |
| 10,546,217 B2 | 1/2020 | Albright et al. |
| 10,552,682 B2 | 2/2020 | Jonsson et al. |
| 10,559,386 B1 | 2/2020 | Neuman |
| 10,565,475 B2 | 2/2020 | Lecue et al. |
| 10,567,674 B2 | 2/2020 | Kirsch |
| 10,568,570 B1 | 2/2020 | Sherpa et al. |
| 10,572,717 B1 | 2/2020 | Zhu et al. |
| 10,574,905 B2 | 2/2020 | Srikanth et al. |
| 10,579,058 B2 | 3/2020 | Oh et al. |
| 10,579,063 B2 | 3/2020 | Haynes et al. |
| 10,579,897 B2 | 3/2020 | Redmon et al. |
| 10,586,280 B2 | 3/2020 | McKenna et al. |
| 10,591,914 B2 | 3/2020 | Palanisamy et al. |
| 10,592,785 B2 | 3/2020 | Zhu et al. |
| 10,599,701 B2 | 3/2020 | Liu |
| 10,599,930 B2 | 3/2020 | Lee et al. |
| 10,599,958 B2 | 3/2020 | He et al. |
| 10,606,990 B2 | 3/2020 | Tuli et al. |
| 10,609,434 B2 | 3/2020 | Singhai et al. |
| 10,614,344 B2 | 4/2020 | Anthony et al. |
| 10,621,513 B2 | 4/2020 | Deshpande et al. |
| 10,627,818 B2 | 4/2020 | Sapp et al. |
| 10,628,432 B2 | 4/2020 | Guo et al. |
| 10,628,686 B2 | 4/2020 | Ogale et al. |
| 10,628,688 B1 | 4/2020 | Kim et al. |
| 10,629,080 B2 | 4/2020 | Kazemi et al. |
| 10,636,161 B2 | 4/2020 | Uchigaito |
| 10,636,169 B2 | 4/2020 | Estrada et al. |
| 10,642,275 B2 | 5/2020 | Silva et al. |
| 10,643,320 B2 | 5/2020 | Lee et al. |
| 10,645,344 B2 | 5/2020 | Marman et al. |
| 10,649,464 B2 | 5/2020 | Gray |
| 10,650,071 B2 | 5/2020 | Asgekar et al. |
| 10,652,565 B1 | 5/2020 | Zhang et al. |
| 10,656,657 B2 | 5/2020 | Djuric et al. |
| 10,657,391 B2 | 5/2020 | Chen et al. |
| 10,657,418 B2 | 5/2020 | Marder et al. |
| 10,657,934 B1 | 5/2020 | Kolen et al. |
| 10,661,902 B1 | 5/2020 | Tavshikar |
| 10,664,750 B2 | 5/2020 | Greene |
| 10,671,082 B2 | 6/2020 | Huang et al. |
| 10,671,886 B2 | 6/2020 | Price et al. |
| 10,678,244 B2 | 6/2020 | Iandola et al. |
| 10,678,839 B2 | 6/2020 | Gordon et al. |
| 10,678,997 B2 | 6/2020 | Ahuja et al. |
| 10,679,129 B2 | 6/2020 | Baker |
| 10,684,626 B1 | 6/2020 | Martin |
| 10,685,159 B2 | 6/2020 | Su et al. |
| 10,685,188 B1 | 6/2020 | Zhang et al. |
| 10,692,000 B2 | 6/2020 | Surazhsky et al. |
| 10,692,242 B1 | 6/2020 | Morrison et al. |
| 10,693,740 B2 | 6/2020 | Coccia et al. |
| 10,698,868 B2 | 6/2020 | Guggilla et al. |
| 10,699,119 B2 | 6/2020 | Lo et al. |
| 10,699,140 B2 | 6/2020 | Kench et al. |
| 10,699,477 B2 | 6/2020 | Levinson et al. |
| 10,713,502 B2 | 7/2020 | Tiziani |
| 10,719,759 B2 | 7/2020 | Kutliroff |
| 10,725,475 B2 | 7/2020 | Yang et al. |
| 10,726,264 B2 | 7/2020 | Sawhney et al. |
| 10,726,279 B1 | 7/2020 | Kim et al. |
| 10,726,374 B1 | 7/2020 | Engineer et al. |
| 10,732,261 B1 | 8/2020 | Wang et al. |
| 10,733,262 B2 | 8/2020 | Miller et al. |
| 10,733,482 B1 | 8/2020 | Lee et al. |
| 10,733,506 B1 * | 8/2020 | Ogale .................... G06N 3/084 |

(56) References Cited

U.S. PATENT DOCUMENTS

| | | |
|---|---|---|
| 10,733,638 B1 | 8/2020 | Jain et al. |
| 10,733,755 B2 | 8/2020 | Liao et al. |
| 10,733,876 B2 | 8/2020 | Moura et al. |
| 10,740,563 B2 | 8/2020 | Dugan |
| 10,740,694 B2 | 8/2020 | Harvill et al. |
| 10,740,914 B2 | 8/2020 | Xiao et al. |
| 10,748,062 B2 | 8/2020 | Rippel et al. |
| 10,748,247 B2 | 8/2020 | Paluri |
| 10,751,879 B2 | 8/2020 | Li et al. |
| 10,755,112 B2 | 8/2020 | Mabuchi |
| 10,755,575 B2 | 8/2020 | Johnston et al. |
| 10,757,330 B2 | 8/2020 | Ashrafi |
| 10,762,396 B2 | 9/2020 | Vallespi et al. |
| 10,768,628 B2 | 9/2020 | Martin et al. |
| 10,768,629 B2 | 9/2020 | Song et al. |
| 10,769,446 B2 | 9/2020 | Chang et al. |
| 10,769,483 B2 | 9/2020 | Nirenberg et al. |
| 10,769,493 B2 | 9/2020 | Yu et al. |
| 10,769,494 B2 | 9/2020 | Xiao et al. |
| 10,769,525 B2 | 9/2020 | Redding et al. |
| 10,776,626 B1 | 9/2020 | Lin et al. |
| 10,776,673 B2 | 9/2020 | Kim et al. |
| 10,776,939 B2 | 9/2020 | Ma et al. |
| 10,779,760 B2 | 9/2020 | Lee et al. |
| 10,783,381 B2 | 9/2020 | Yu et al. |
| 10,783,454 B2 | 9/2020 | Shoaib et al. |
| 10,789,402 B1 | 9/2020 | Vemuri et al. |
| 10,789,544 B2 | 9/2020 | Fiedel et al. |
| 10,790,919 B1 | 9/2020 | Kolen et al. |
| 10,796,221 B2 | 10/2020 | Zhang et al. |
| 10,796,355 B1 | 10/2020 | Price et al. |
| 10,796,423 B2 | 10/2020 | Goja |
| 10,798,368 B2 | 10/2020 | Briggs et al. |
| 10,803,325 B2 | 10/2020 | Bai et al. |
| 10,803,328 B1 | 10/2020 | Bai et al. |
| 10,803,743 B2 | 10/2020 | Abari et al. |
| 10,805,629 B2 | 10/2020 | Liu et al. |
| 10,809,730 B2 | 10/2020 | Chintakindi |
| 10,810,445 B1 | 10/2020 | Kangaspunta |
| 10,816,346 B2 | 10/2020 | Wheeler et al. |
| 10,816,992 B2 | 10/2020 | Chen |
| 10,817,731 B2 | 10/2020 | Vallespi et al. |
| 10,817,732 B2 | 10/2020 | Porter et al. |
| 10,819,923 B1 | 10/2020 | McCauley et al. |
| 10,824,122 B2 | 11/2020 | Mummadi et al. |
| 10,824,862 B2 | 11/2020 | Qi et al. |
| 10,828,790 B2 | 11/2020 | Nemallan |
| 10,832,057 B2 | 11/2020 | Chan et al. |
| 10,832,093 B1 | 11/2020 | Taralova et al. |
| 10,832,414 B2 | 11/2020 | Pfeiffer |
| 10,832,418 B1 | 11/2020 | Karasev et al. |
| 10,833,785 B1 | 11/2020 | O'Shea et al. |
| 10,836,379 B2 | 11/2020 | Xiao et al. |
| 10,838,936 B2 | 11/2020 | Cohen |
| 10,839,230 B2 | 11/2020 | Charette et al. |
| 10,839,578 B2 | 11/2020 | Coppersmith et al. |
| 10,843,628 B2 | 11/2020 | Kawamoto et al. |
| 10,845,820 B2 | 11/2020 | Wheeler |
| 10,845,943 B1 | 11/2020 | Ansari et al. |
| 10,846,831 B2 | 11/2020 | Raduta |
| 10,846,888 B2 | 11/2020 | Kaplanyan et al. |
| 10,853,670 B2 | 12/2020 | Sholingar et al. |
| 10,853,739 B2 | 12/2020 | Truong et al. |
| 10,860,919 B2 | 12/2020 | Kanazawa et al. |
| 10,860,924 B2 | 12/2020 | Burger |
| 10,867,444 B2 | 12/2020 | Russell et al. |
| 10,871,444 B2 | 12/2020 | Al et al. |
| 10,871,782 B2 | 12/2020 | Milstein et al. |
| 10,872,204 B2 | 12/2020 | Zhu et al. |
| 10,872,254 B2 | 12/2020 | Mangla et al. |
| 10,872,326 B2 | 12/2020 | Garner |
| 10,872,531 B2 | 12/2020 | Liu et al. |
| 10,885,083 B2 | 1/2021 | Moeller-Bertram et al. |
| 10,887,433 B2 | 1/2021 | Fu et al. |
| 10,890,898 B2 | 1/2021 | Akella et al. |
| 10,891,715 B2 | 1/2021 | Li |
| 10,891,735 B2 | 1/2021 | Yang et al. |
| 10,893,070 B2 | 1/2021 | Wang et al. |
| 10,893,107 B1 | 1/2021 | Callari et al. |
| 10,896,763 B2 | 1/2021 | Kempanna et al. |
| 10,901,416 B2 | 1/2021 | Khanna et al. |
| 10,901,508 B2 | 1/2021 | Laszlo et al. |
| 10,902,551 B1 | 1/2021 | Mellado et al. |
| 10,908,068 B2 | 2/2021 | Amer et al. |
| 10,908,606 B2 | 2/2021 | Stein et al. |
| 10,909,368 B2 | 2/2021 | Guo et al. |
| 10,909,453 B1 | 2/2021 | Myers et al. |
| 10,915,783 B1 | 2/2021 | Hallman et al. |
| 10,917,522 B2 | 2/2021 | Segalis et al. |
| 10,921,817 B1 | 2/2021 | Kangaspunta |
| 10,922,578 B2 | 2/2021 | Banerjee et al. |
| 10,924,661 B2 | 2/2021 | Vasconcelos et al. |
| 10,928,508 B2 | 2/2021 | Swaminathan |
| 10,929,757 B2 | 2/2021 | Baker et al. |
| 10,930,065 B2 | 2/2021 | Grant et al. |
| 10,936,908 B1 | 3/2021 | Ho et al. |
| 10,937,186 B2 | 3/2021 | Wang et al. |
| 10,943,101 B2 | 3/2021 | Agarwal et al. |
| 10,943,132 B2 | 3/2021 | Wang et al. |
| 10,943,355 B2 | 3/2021 | Fagg et al. |
| 10,990,826 B1 | 4/2021 | Haider et al. |
| 11,157,287 B2 | 10/2021 | Talpes et al. |
| 11,157,441 B2 | 10/2021 | Talpes et al. |
| 11,256,958 B1 | 2/2022 | Subbiah et al. |
| 11,282,235 B2 | 3/2022 | Torikura et al. |
| 11,292,462 B1 | 4/2022 | Karasev et al. |
| 11,295,180 B1 | 4/2022 | Tolstov et al. |
| 11,409,692 B2 | 8/2022 | Das Sarma et al. |
| 11,430,177 B2 | 8/2022 | Lasram et al. |
| 11,615,223 B2 | 3/2023 | Taralova |
| 11,625,041 B2 | 4/2023 | Das et al. |
| 11,921,824 B1 | 3/2024 | Hester et al. |
| 2003/0035481 A1 | 2/2003 | Hahm |
| 2005/0162445 A1 | 7/2005 | Sheasby et al. |
| 2006/0072847 A1 | 4/2006 | Chor et al. |
| 2006/0098843 A1 | 5/2006 | Chew |
| 2006/0224533 A1 | 10/2006 | Thaler |
| 2006/0280364 A1 | 12/2006 | Ma et al. |
| 2009/0016571 A1 | 1/2009 | Tijerina et al. |
| 2010/0118157 A1 | 5/2010 | Kameyama |
| 2012/0109915 A1 | 5/2012 | Kamekawa et al. |
| 2012/0110491 A1 | 5/2012 | Cheung |
| 2012/0134595 A1 | 5/2012 | Fonseca et al. |
| 2013/0342692 A1 | 12/2013 | Li et al. |
| 2014/0003709 A1 | 1/2014 | Ranganathan et al. |
| 2014/0093176 A1 | 4/2014 | Maeda et al. |
| 2014/0270362 A1 | 9/2014 | Najafi Shoushtari et al. |
| 2015/0104102 A1 | 4/2015 | Carreira et al. |
| 2016/0003636 A1 | 1/2016 | Ng-Thow-Hing et al. |
| 2016/0132786 A1 | 5/2016 | Balan et al. |
| 2016/0180197 A1 | 6/2016 | Kim et al. |
| 2016/0307071 A1 | 10/2016 | Perronnin et al. |
| 2016/0328856 A1 | 11/2016 | Mannino et al. |
| 2017/0011281 A1 | 1/2017 | Dihkman et al. |
| 2017/0060379 A1 | 3/2017 | Capozella et al. |
| 2017/0158134 A1 | 6/2017 | Shigemura |
| 2017/0206434 A1 | 7/2017 | Nariyambut et al. |
| 2018/0012411 A1 | 1/2018 | Richey et al. |
| 2018/0018590 A1 | 1/2018 | Szeto et al. |
| 2018/0039853 A1 | 2/2018 | Liu et al. |
| 2018/0067489 A1 | 3/2018 | Oder et al. |
| 2018/0068459 A1 | 3/2018 | Zhang et al. |
| 2018/0068540 A1 | 3/2018 | Romanenko et al. |
| 2018/0074506 A1 | 3/2018 | Branson |
| 2018/0121762 A1 | 5/2018 | Han et al. |
| 2018/0150081 A1 | 5/2018 | Gross et al. |
| 2018/0188027 A1 | 7/2018 | Zhang et al. |
| 2018/0189578 A1 | 7/2018 | Yang et al. |
| 2018/0203456 A1 | 7/2018 | Nagasaka et al. |
| 2018/0211403 A1 | 7/2018 | Hotson et al. |
| 2018/0308012 A1 | 10/2018 | Mummadi et al. |
| 2018/0314878 A1 | 11/2018 | Lee et al. |
| 2018/0348346 A1 | 12/2018 | Vallespi-Gonzalez et al. |
| 2018/0357492 A1 | 12/2018 | Allen et al. |

(56) References Cited

U.S. PATENT DOCUMENTS

| | | |
|---|---|---|
| 2018/0357511 A1 | 12/2018 | Misra et al. |
| 2018/0374105 A1 | 12/2018 | Azout et al. |
| 2019/0023277 A1 | 1/2019 | Roger et al. |
| 2019/0025773 A1 | 1/2019 | Yang et al. |
| 2019/0026250 A1 | 1/2019 | Das Sarma et al. |
| 2019/0042894 A1 | 2/2019 | Anderson |
| 2019/0042919 A1 | 2/2019 | Peysakhovich et al. |
| 2019/0042944 A1 | 2/2019 | Nair et al. |
| 2019/0042948 A1 | 2/2019 | Lee et al. |
| 2019/0057314 A1 | 2/2019 | Julian et al. |
| 2019/0065637 A1 | 2/2019 | Bogdoll et al. |
| 2019/0072978 A1 | 3/2019 | Levi |
| 2019/0079526 A1 | 3/2019 | Vallespi et al. |
| 2019/0080602 A1 | 3/2019 | Rice et al. |
| 2019/0095780 A1 | 3/2019 | Zhong et al. |
| 2019/0095946 A1 | 3/2019 | Azout et al. |
| 2019/0096256 A1 | 3/2019 | Rowell |
| 2019/0101914 A1 | 4/2019 | Coleman et al. |
| 2019/0108417 A1 | 4/2019 | Talagala et al. |
| 2019/0122111 A1 | 4/2019 | Min et al. |
| 2019/0130255 A1 | 5/2019 | Yim et al. |
| 2019/0145765 A1 | 5/2019 | Luo et al. |
| 2019/0146497 A1 | 5/2019 | Urtasun et al. |
| 2019/0146519 A1 | 5/2019 | Miura et al. |
| 2019/0147112 A1 | 5/2019 | Gordon |
| 2019/0147250 A1 | 5/2019 | Zhang et al. |
| 2019/0147254 A1 | 5/2019 | Bai et al. |
| 2019/0147255 A1 | 5/2019 | Homayounfar et al. |
| 2019/0147335 A1 | 5/2019 | Wang et al. |
| 2019/0147372 A1 | 5/2019 | Luo et al. |
| 2019/0156485 A1 | 5/2019 | Pfeiffer |
| 2019/0158784 A1 | 5/2019 | Ahn et al. |
| 2019/0180154 A1 | 6/2019 | Orlov et al. |
| 2019/0185010 A1 | 6/2019 | Ganguli et al. |
| 2019/0189251 A1 | 6/2019 | Horiuchi et al. |
| 2019/0197357 A1 | 6/2019 | Anderson et al. |
| 2019/0204842 A1 | 7/2019 | Jafari et al. |
| 2019/0205402 A1 | 7/2019 | Sernau et al. |
| 2019/0205667 A1 | 7/2019 | Avidan et al. |
| 2019/0217791 A1 | 7/2019 | Bradley et al. |
| 2019/0227562 A1 | 7/2019 | Mohammadiha et al. |
| 2019/0228037 A1 | 7/2019 | Nicol et al. |
| 2019/0230282 A1 | 7/2019 | Sypitkowski et al. |
| 2019/0232955 A1 | 8/2019 | Grimm et al. |
| 2019/0235499 A1 | 8/2019 | Kazemi et al. |
| 2019/0236437 A1 | 8/2019 | Shin et al. |
| 2019/0243371 A1 | 8/2019 | Nister et al. |
| 2019/0244138 A1 | 8/2019 | Bhowmick et al. |
| 2019/0250622 A1 | 8/2019 | Nister et al. |
| 2019/0250626 A1 | 8/2019 | Ghafarianzadeh et al. |
| 2019/0250640 A1 | 8/2019 | O'Flaherty et al. |
| 2019/0251397 A1 | 8/2019 | Tremblay et al. |
| 2019/0258878 A1 | 8/2019 | Koivisto et al. |
| 2019/0266418 A1 | 8/2019 | Xu et al. |
| 2019/0266610 A1 | 8/2019 | Ghatage et al. |
| 2019/0271559 A1 | 9/2019 | Colgate et al. |
| 2019/0272446 A1 | 9/2019 | Kangaspunta et al. |
| 2019/0276041 A1 | 9/2019 | Choi et al. |
| 2019/0279004 A1 | 9/2019 | Kwon et al. |
| 2019/0286652 A1 | 9/2019 | Habbecke et al. |
| 2019/0286972 A1 | 9/2019 | El Husseini et al. |
| 2019/0287028 A1 | 9/2019 | St Amant et al. |
| 2019/0289281 A1 | 9/2019 | Badrinarayanan et al. |
| 2019/0294177 A1 | 9/2019 | Kwon et al. |
| 2019/0294975 A1 | 9/2019 | Sachs |
| 2019/0303759 A1 | 10/2019 | Farabet et al. |
| 2019/0311290 A1 | 10/2019 | Huang et al. |
| 2019/0318099 A1 | 10/2019 | Carvalho et al. |
| 2019/0325088 A1 | 10/2019 | Dubey et al. |
| 2019/0325266 A1 | 10/2019 | Klepper et al. |
| 2019/0325269 A1 | 10/2019 | Bagherinezhad et al. |
| 2019/0325580 A1 | 10/2019 | Lukac et al. |
| 2019/0325595 A1 | 10/2019 | Stein et al. |
| 2019/0329790 A1 | 10/2019 | Nandakumar et al. |
| 2019/0332875 A1 | 10/2019 | Vallespi-Gonzalez et al. |
| 2019/0333232 A1 | 10/2019 | Vallespi-Gonzalez et al. |
| 2019/0336063 A1 | 11/2019 | Dascalu |
| 2019/0339989 A1 | 11/2019 | Liang et al. |
| 2019/0340462 A1 | 11/2019 | Pao et al. |
| 2019/0340492 A1 | 11/2019 | Burger et al. |
| 2019/0340499 A1 | 11/2019 | Burger et al. |
| 2019/0347501 A1 | 11/2019 | Kim et al. |
| 2019/0349571 A1 | 11/2019 | Herman et al. |
| 2019/0354782 A1 | 11/2019 | Kee et al. |
| 2019/0354786 A1 | 11/2019 | Lee et al. |
| 2019/0354808 A1 | 11/2019 | Park et al. |
| 2019/0354817 A1 | 11/2019 | Shlens et al. |
| 2019/0354850 A1 | 11/2019 | Watson et al. |
| 2019/0370398 A1 | 12/2019 | He et al. |
| 2019/0370575 A1 | 12/2019 | Nandakumar et al. |
| 2019/0370935 A1 | 12/2019 | Chang et al. |
| 2019/0373322 A1 | 12/2019 | Rojas-Echenique et al. |
| 2019/0377345 A1 | 12/2019 | Bachrach et al. |
| 2019/0377965 A1 | 12/2019 | Totolos et al. |
| 2019/0378049 A1 | 12/2019 | Widmann et al. |
| 2019/0378051 A1 | 12/2019 | Widmann et al. |
| 2019/0382007 A1 | 12/2019 | Casas et al. |
| 2019/0384303 A1 | 12/2019 | Muller et al. |
| 2019/0384304 A1 | 12/2019 | Towal et al. |
| 2019/0384309 A1 | 12/2019 | Silva et al. |
| 2019/0384994 A1 | 12/2019 | Frossard et al. |
| 2019/0385048 A1 | 12/2019 | Cassidy et al. |
| 2019/0385360 A1 | 12/2019 | Yang et al. |
| 2020/0004259 A1 | 1/2020 | Gulino et al. |
| 2020/0004351 A1 | 1/2020 | Marchant et al. |
| 2020/0012936 A1 | 1/2020 | Lee et al. |
| 2020/0017117 A1 | 1/2020 | Milton |
| 2020/0025931 A1 | 1/2020 | Liang et al. |
| 2020/0026282 A1 | 1/2020 | Choe et al. |
| 2020/0026283 A1 | 1/2020 | Barnes et al. |
| 2020/0026992 A1 | 1/2020 | Zhang et al. |
| 2020/0027210 A1 | 1/2020 | Haemel et al. |
| 2020/0033858 A1 | 1/2020 | Xiao |
| 2020/0033865 A1 | 1/2020 | Mellinger et al. |
| 2020/0034665 A1 | 1/2020 | Ghanta et al. |
| 2020/0034710 A1 | 1/2020 | Sidhu et al. |
| 2020/0036948 A1 | 1/2020 | Song |
| 2020/0039520 A1 | 2/2020 | Misu et al. |
| 2020/0051550 A1 | 2/2020 | Baker |
| 2020/0057487 A1 | 2/2020 | Sicconi et al. |
| 2020/0060757 A1 | 2/2020 | Ben-Haim et al. |
| 2020/0065711 A1 | 2/2020 | Clément et al. |
| 2020/0065879 A1 | 2/2020 | Hu et al. |
| 2020/0069973 A1 | 3/2020 | Lou et al. |
| 2020/0073385 A1 | 3/2020 | Jobanputra et al. |
| 2020/0074230 A1 | 3/2020 | England et al. |
| 2020/0074266 A1 | 3/2020 | Peake et al. |
| 2020/0086880 A1 | 3/2020 | Poeppel et al. |
| 2020/0089243 A1 | 3/2020 | Poeppel et al. |
| 2020/0089969 A1 | 3/2020 | Lakshmi et al. |
| 2020/0090056 A1 | 3/2020 | Singhal et al. |
| 2020/0097841 A1 | 3/2020 | Petousis et al. |
| 2020/0098095 A1 | 3/2020 | Borcs et al. |
| 2020/0103894 A1 | 4/2020 | Cella et al. |
| 2020/0104705 A1 | 4/2020 | Bhowmick et al. |
| 2020/0110416 A1 | 4/2020 | Hong et al. |
| 2020/0117180 A1 | 4/2020 | Cella et al. |
| 2020/0117889 A1 | 4/2020 | Laput et al. |
| 2020/0117916 A1 | 4/2020 | Liu |
| 2020/0117917 A1 | 4/2020 | Yoo |
| 2020/0118035 A1 | 4/2020 | Asawa et al. |
| 2020/0118294 A1 | 4/2020 | Nakao et al. |
| 2020/0125112 A1 | 4/2020 | Mao et al. |
| 2020/0125844 A1 | 4/2020 | She et al. |
| 2020/0125845 A1 | 4/2020 | Hess et al. |
| 2020/0126129 A1 | 4/2020 | Lkhamsuren et al. |
| 2020/0134379 A1 | 4/2020 | Gaidon et al. |
| 2020/0134427 A1 | 4/2020 | Oh et al. |
| 2020/0134461 A1 | 4/2020 | Chai et al. |
| 2020/0134466 A1 | 4/2020 | Weintraub et al. |
| 2020/0134848 A1 | 4/2020 | El-Khamy et al. |
| 2020/0143231 A1 | 5/2020 | Fusi et al. |
| 2020/0143279 A1 | 5/2020 | West et al. |
| 2020/0148201 A1 | 5/2020 | King et al. |

(56) References Cited

U.S. PATENT DOCUMENTS

| | | |
|---|---|---|
| 2020/0149898 A1 | 5/2020 | Felip et al. |
| 2020/0151201 A1 | 5/2020 | Chandrasekhar et al. |
| 2020/0151619 A1 | 5/2020 | Mopur et al. |
| 2020/0151692 A1 | 5/2020 | Gao et al. |
| 2020/0158822 A1 | 5/2020 | Owens et al. |
| 2020/0158869 A1 | 5/2020 | Amirloo et al. |
| 2020/0159225 A1 | 5/2020 | Zeng et al. |
| 2020/0160064 A1 | 5/2020 | Wang et al. |
| 2020/0160104 A1 | 5/2020 | Urtasun et al. |
| 2020/0160117 A1 | 5/2020 | Urtasun et al. |
| 2020/0160178 A1 | 5/2020 | Kar et al. |
| 2020/0160532 A1 | 5/2020 | Urtasun et al. |
| 2020/0160558 A1 | 5/2020 | Urtasun et al. |
| 2020/0160559 A1 | 5/2020 | Urtasun et al. |
| 2020/0160598 A1 | 5/2020 | Manivasagam et al. |
| 2020/0162489 A1 | 5/2020 | Bar-Nahum et al. |
| 2020/0167438 A1 | 5/2020 | Herring |
| 2020/0167554 A1 | 5/2020 | Wang et al. |
| 2020/0174481 A1 | 6/2020 | Van Heukelom et al. |
| 2020/0175326 A1 | 6/2020 | Shen et al. |
| 2020/0175354 A1 | 6/2020 | Volodarskiy et al. |
| 2020/0175371 A1 | 6/2020 | Kursun |
| 2020/0175401 A1 | 6/2020 | Shen |
| 2020/0183482 A1 | 6/2020 | Sebot et al. |
| 2020/0184250 A1 | 6/2020 | Oko |
| 2020/0184333 A1 | 6/2020 | Oh |
| 2020/0192389 A1 | 6/2020 | ReMine et al. |
| 2020/0193313 A1 | 6/2020 | Ghanta et al. |
| 2020/0193328 A1 | 6/2020 | Guestrin et al. |
| 2020/0202136 A1 | 6/2020 | Shrestha et al. |
| 2020/0202196 A1 | 6/2020 | Guo et al. |
| 2020/0209857 A1 | 7/2020 | Djuric et al. |
| 2020/0209867 A1 | 7/2020 | Valois et al. |
| 2020/0209874 A1 | 7/2020 | Chen et al. |
| 2020/0210717 A1 | 7/2020 | Hou et al. |
| 2020/0210769 A1 | 7/2020 | Hou et al. |
| 2020/0210777 A1 | 7/2020 | Valois et al. |
| 2020/0216064 A1 | 7/2020 | du Toit et al. |
| 2020/0218722 A1 | 7/2020 | Mai et al. |
| 2020/0218910 A1* | 7/2020 | Herman ............... B60R 1/27 |
| 2020/0218979 A1 | 7/2020 | Kwon et al. |
| 2020/0223434 A1 | 7/2020 | Campos et al. |
| 2020/0225758 A1 | 7/2020 | Tang et al. |
| 2020/0226377 A1 | 7/2020 | Campos et al. |
| 2020/0226430 A1 | 7/2020 | Ahuja et al. |
| 2020/0238998 A1 | 7/2020 | Dasalukunte et al. |
| 2020/0242381 A1 | 7/2020 | Chao et al. |
| 2020/0242408 A1 | 7/2020 | Kim et al. |
| 2020/0242479 A1 | 7/2020 | Kim et al. |
| 2020/0242511 A1 | 7/2020 | Kale et al. |
| 2020/0245654 A1 | 8/2020 | Zhu et al. |
| 2020/0245869 A1 | 8/2020 | Sivan et al. |
| 2020/0249685 A1 | 8/2020 | Elluswamy et al. |
| 2020/0250456 A1 | 8/2020 | Wang et al. |
| 2020/0250515 A1 | 8/2020 | Rifkin et al. |
| 2020/0250874 A1 | 8/2020 | Assouline et al. |
| 2020/0257301 A1 | 8/2020 | Weiser et al. |
| 2020/0257306 A1 | 8/2020 | Nisenzon |
| 2020/0258057 A1 | 8/2020 | Farahat et al. |
| 2020/0265247 A1 | 8/2020 | Musk et al. |
| 2020/0272160 A1 | 8/2020 | Djuric et al. |
| 2020/0272162 A1 | 8/2020 | Hasselgren et al. |
| 2020/0272859 A1 | 8/2020 | Iashyn et al. |
| 2020/0273231 A1 | 8/2020 | Schied et al. |
| 2020/0279354 A1 | 9/2020 | Klaiman |
| 2020/0279364 A1 | 9/2020 | Sarkisian et al. |
| 2020/0279371 A1 | 9/2020 | Wenzel et al. |
| 2020/0285464 A1 | 9/2020 | Brebner |
| 2020/0286256 A1 | 9/2020 | Houts et al. |
| 2020/0293786 A1 | 9/2020 | Jia et al. |
| 2020/0293796 A1 | 9/2020 | Sajjadi et al. |
| 2020/0293828 A1 | 9/2020 | Wang et al. |
| 2020/0293905 A1 | 9/2020 | Huang et al. |
| 2020/0294162 A1 | 9/2020 | Shah |
| 2020/0294257 A1 | 9/2020 | Yoo et al. |
| 2020/0294310 A1 | 9/2020 | Lee et al. |
| 2020/0297237 A1 | 9/2020 | Tamersoy et al. |
| 2020/0298891 A1 | 9/2020 | Liang et al. |
| 2020/0301799 A1 | 9/2020 | Manivasagam et al. |
| 2020/0302276 A1 | 9/2020 | Yang et al. |
| 2020/0302291 A1 | 9/2020 | Hong |
| 2020/0302627 A1 | 9/2020 | Duggal et al. |
| 2020/0302662 A1 | 9/2020 | Homayounfar et al. |
| 2020/0304441 A1 | 9/2020 | Bradley et al. |
| 2020/0306640 A1 | 10/2020 | Kolen et al. |
| 2020/0307562 A1 | 10/2020 | Ghafarianzadeh et al. |
| 2020/0307563 A1 | 10/2020 | Ghafarianzadeh et al. |
| 2020/0307578 A1 | 10/2020 | Magolan et al. |
| 2020/0309536 A1 | 10/2020 | Omari et al. |
| 2020/0309923 A1 | 10/2020 | Bhaskaran et al. |
| 2020/0310442 A1 | 10/2020 | Halder et al. |
| 2020/0311601 A1 | 10/2020 | Robinson et al. |
| 2020/0312003 A1 | 10/2020 | Borovikov et al. |
| 2020/0315708 A1 | 10/2020 | Mosnier et al. |
| 2020/0320132 A1 | 10/2020 | Neumann |
| 2020/0324073 A1 | 10/2020 | Rajan et al. |
| 2020/0327192 A1 | 10/2020 | Hackman et al. |
| 2020/0327443 A1 | 10/2020 | Van et al. |
| 2020/0327449 A1 | 10/2020 | Tiwari et al. |
| 2020/0327662 A1 | 10/2020 | Liu et al. |
| 2020/0327667 A1 | 10/2020 | Arbel et al. |
| 2020/0331476 A1 | 10/2020 | Chen et al. |
| 2020/0334416 A1 | 10/2020 | Vianu et al. |
| 2020/0334495 A1 | 10/2020 | Al et al. |
| 2020/0334501 A1 | 10/2020 | Lin et al. |
| 2020/0334551 A1 | 10/2020 | Javidi et al. |
| 2020/0334574 A1 | 10/2020 | Ishida |
| 2020/0337648 A1 | 10/2020 | Saripalli et al. |
| 2020/0339109 A1 | 10/2020 | Hong et al. |
| 2020/0341466 A1 | 10/2020 | Pham et al. |
| 2020/0342350 A1 | 10/2020 | Madar et al. |
| 2020/0342548 A1 | 10/2020 | Mazed et al. |
| 2020/0342652 A1 | 10/2020 | Rowell et al. |
| 2020/0348909 A1 | 11/2020 | Das Sarma et al. |
| 2020/0350063 A1 | 11/2020 | Thornton et al. |
| 2020/0351438 A1 | 11/2020 | Dewhurst et al. |
| 2020/0356107 A1 | 11/2020 | Wells |
| 2020/0356790 A1 | 11/2020 | Jaipuria et al. |
| 2020/0356864 A1 | 11/2020 | Neumann |
| 2020/0356905 A1 | 11/2020 | Luk et al. |
| 2020/0361083 A1 | 11/2020 | Mousavian et al. |
| 2020/0361485 A1 | 11/2020 | Zhu et al. |
| 2020/0364481 A1 | 11/2020 | Kornienko et al. |
| 2020/0364508 A1 | 11/2020 | Gurel et al. |
| 2020/0364540 A1 | 11/2020 | Elsayed et al. |
| 2020/0364746 A1 | 11/2020 | Longano et al. |
| 2020/0364953 A1 | 11/2020 | Simoudis |
| 2020/0372362 A1 | 11/2020 | Kim |
| 2020/0372402 A1 | 11/2020 | Kursun et al. |
| 2020/0380362 A1 | 12/2020 | Cao et al. |
| 2020/0380383 A1 | 12/2020 | Kwong et al. |
| 2020/0393841 A1 | 12/2020 | Frisbie et al. |
| 2020/0394421 A1 | 12/2020 | Yu et al. |
| 2020/0394457 A1 | 12/2020 | Brady |
| 2020/0394495 A1 | 12/2020 | Moudgill et al. |
| 2020/0394813 A1 | 12/2020 | Theverapperuma et al. |
| 2020/0394911 A1 | 12/2020 | Harmel et al. |
| 2020/0396394 A1 | 12/2020 | Zlokolica et al. |
| 2020/0398855 A1 | 12/2020 | Thompson |
| 2020/0401850 A1 | 12/2020 | Bazarsky et al. |
| 2020/0401886 A1 | 12/2020 | Deng et al. |
| 2020/0402155 A1 | 12/2020 | Kurian et al. |
| 2020/0402226 A1 | 12/2020 | Peng |
| 2020/0409364 A1 | 12/2020 | Agrawal |
| 2020/0410012 A1 | 12/2020 | Moon et al. |
| 2020/0410224 A1 | 12/2020 | Goel |
| 2020/0410254 A1 | 12/2020 | Pham et al. |
| 2020/0410288 A1 | 12/2020 | Capota et al. |
| 2020/0410751 A1 | 12/2020 | Omari et al. |
| 2021/0004014 A1 | 1/2021 | Sivakumar |
| 2021/0004580 A1 | 1/2021 | Sundararaman et al. |
| 2021/0004611 A1 | 1/2021 | Garimella et al. |
| 2021/0004663 A1 | 1/2021 | Park et al. |
| 2021/0006835 A1 | 1/2021 | Slattery et al. |

(56) References Cited

U.S. PATENT DOCUMENTS

| | | |
|---|---|---|
| 2021/0011908 A1 | 1/2021 | Hayes et al. |
| 2021/0012116 A1 | 1/2021 | Urtasun et al. |
| 2021/0012210 A1 | 1/2021 | Sikka et al. |
| 2021/0012230 A1 | 1/2021 | Hayes et al. |
| 2021/0012239 A1 | 1/2021 | Arzani et al. |
| 2021/0015240 A1 | 1/2021 | Elfakhri et al. |
| 2021/0019215 A1 | 1/2021 | Neeter |
| 2021/0026360 A1 | 1/2021 | Luo |
| 2021/0027112 A1 | 1/2021 | Brewington et al. |
| 2021/0027117 A1 | 1/2021 | McGavran et al. |
| 2021/0030276 A1 | 2/2021 | Li et al. |
| 2021/0034921 A1 | 2/2021 | Pinkovich et al. |
| 2021/0042575 A1 | 2/2021 | Firner |
| 2021/0042928 A1 | 2/2021 | Takeda et al. |
| 2021/0046954 A1 | 2/2021 | Haynes |
| 2021/0049378 A1 | 2/2021 | Gautam et al. |
| 2021/0049455 A1 | 2/2021 | Kursun |
| 2021/0049456 A1 | 2/2021 | Kursun |
| 2021/0049548 A1 | 2/2021 | Grisz et al. |
| 2021/0049700 A1 | 2/2021 | Nguyen et al. |
| 2021/0056114 A1 | 2/2021 | Price et al. |
| 2021/0056306 A1 | 2/2021 | Hu et al. |
| 2021/0056317 A1 | 2/2021 | Golov |
| 2021/0056420 A1 | 2/2021 | Konishi et al. |
| 2021/0056701 A1 | 2/2021 | Vranceanu et al. |
| 2021/0163031 A1 | 6/2021 | Jagbrant et al. |
| 2021/0233390 A1 | 7/2021 | Georgiou et al. |
| 2021/0263157 A1 | 8/2021 | Zhu |
| 2021/0271259 A1 | 9/2021 | Karpathy |
| 2021/0271898 A1 | 9/2021 | Chen et al. |
| 2021/0276574 A1 | 9/2021 | Efrat Sela et al. |
| 2021/0302992 A1 | 9/2021 | Chen et al. |
| 2021/0303922 A1 | 9/2021 | Tu et al. |
| 2021/0342609 A1 | 11/2021 | Smolyanskiy et al. |
| 2021/0358137 A1 | 11/2021 | Lee et al. |
| 2021/0406560 A1 | 12/2021 | Park et al. |
| 2022/0044034 A1 | 2/2022 | Roychowdhury et al. |
| 2022/0083785 A1 | 3/2022 | Subramanian et al. |
| 2022/0092349 A1 | 3/2022 | Yang |
| 2022/0105947 A1 | 4/2022 | Postnikov et al. |
| 2022/0156525 A1 | 5/2022 | Guizilini et al. |
| 2022/0185625 A1 | 6/2022 | One |
| 2022/0299656 A1 | 9/2022 | Cui et al. |
| 2022/0383741 A1 | 12/2022 | Sanchez |
| 2023/0053785 A1 | 2/2023 | Carvalho et al. |
| 2023/0057509 A1 | 2/2023 | Emmons et al. |
| 2023/0085938 A1 | 3/2023 | He et al. |
| 2023/0110027 A1 | 4/2023 | Bajpayee et al. |
| 2023/0326215 A1 | 10/2023 | Yu et al. |
| 2024/0160194 A1 | 5/2024 | Bakhshmand et al. |
| 2024/0317267 A1 | 9/2024 | Bergquist et al. |
| 2024/0353231 A1 | 10/2024 | Burlina et al. |

FOREIGN PATENT DOCUMENTS

| | | |
|---|---|---|
| CN | 110599537 A | 12/2010 |
| CN | 102737236 A | 10/2012 |
| CN | 103366339 A | 10/2013 |
| CN | 104835114 A | 8/2015 |
| CN | 103236037 B | 5/2016 |
| CN | 103500322 B | 8/2016 |
| CN | 106419893 A | 2/2017 |
| CN | 106504253 A | 3/2017 |
| CN | 107031600 A | 8/2017 |
| CN | 107169421 A | 9/2017 |
| CN | 107507134 A | 12/2017 |
| CN | 107885214 A | 4/2018 |
| CN | 108122234 A | 6/2018 |
| CN | 107133943 B | 7/2018 |
| CN | 107368926 B | 7/2018 |
| CN | 105318888 B | 8/2018 |
| CN | 108491889 A | 9/2018 |
| CN | 108647591 A | 10/2018 |
| CN | 108710865 A | 10/2018 |
| CN | 105550701 B | 11/2018 |
| CN | 108764185 A | 11/2018 |
| CN | 108845574 A | 11/2018 |
| CN | 108898177 A | 11/2018 |
| CN | 109086867 A | 12/2018 |
| CN | 107103113 B | 1/2019 |
| CN | 109215067 A | 1/2019 |
| CN | 109359731 A | 2/2019 |
| CN | 109389207 A | 2/2019 |
| CN | 109389552 A | 2/2019 |
| CN | 106779060 B | 3/2019 |
| CN | 109579856 A | 4/2019 |
| CN | 109615073 A | 4/2019 |
| CN | 106156754 B | 5/2019 |
| CN | 106598226 B | 5/2019 |
| CN | 106650922 B | 5/2019 |
| CN | 109791626 A | 5/2019 |
| CN | 109901595 A | 6/2019 |
| CN | 109902732 A | 6/2019 |
| CN | 109934163 A | 6/2019 |
| CN | 109948428 A | 6/2019 |
| CN | 109949257 A | 6/2019 |
| CN | 109951710 A | 6/2019 |
| CN | 109975308 A | 7/2019 |
| CN | 109978132 A | 7/2019 |
| CN | 109978161 A | 7/2019 |
| CN | 110060202 A | 7/2019 |
| CN | 110069071 A | 7/2019 |
| CN | 110084086 A | 8/2019 |
| CN | 110096937 A | 8/2019 |
| CN | 110111340 A | 8/2019 |
| CN | 110135485 A | 8/2019 |
| CN | 110197270 B | 9/2019 |
| CN | 110310264 A | 10/2019 |
| CN | 110321965 A | 10/2019 |
| CN | 110334801 A | 10/2019 |
| CN | 110399875 A | 11/2019 |
| CN | 110414362 A | 11/2019 |
| CN | 110426051 A | 11/2019 |
| CN | 110473173 A | 11/2019 |
| CN | 110516665 A | 11/2019 |
| CN | 110543837 A | 12/2019 |
| CN | 110569899 A | 12/2019 |
| CN | 110599864 A | 12/2019 |
| CN | 110619282 A | 12/2019 |
| CN | 110619283 A | 12/2019 |
| CN | 110619330 A | 12/2019 |
| CN | 110659628 A | 1/2020 |
| CN | 110688992 A | 1/2020 |
| CN | 107742311 B | 2/2020 |
| CN | 110751280 A | 2/2020 |
| CN | 110826566 A | 2/2020 |
| CN | 107451659 B | 4/2020 |
| CN | 108111873 B | 4/2020 |
| CN | 110956185 A | 4/2020 |
| CN | 110966991 A | 4/2020 |
| CN | 111027549 A | 4/2020 |
| CN | 111027575 A | 4/2020 |
| CN | 111047225 A | 4/2020 |
| CN | 111126453 A | 5/2020 |
| CN | 111158355 A | 5/2020 |
| CN | 107729998 B | 6/2020 |
| CN | 108549934 B | 6/2020 |
| CN | 111275129 A | 6/2020 |
| CN | 111275618 A | 6/2020 |
| CN | 111326023 A | 6/2020 |
| CN | 111428943 A | 7/2020 |
| CN | 111444821 A | 7/2020 |
| CN | 111445420 A | 7/2020 |
| CN | 111461052 A | 7/2020 |
| CN | 111461053 A | 7/2020 |
| CN | 111461110 A | 7/2020 |
| CN | 110225341 B | 8/2020 |
| CN | 111307162 B | 8/2020 |
| CN | 111488770 A | 8/2020 |
| CN | 111539514 A | 8/2020 |
| CN | 111565318 A | 8/2020 |
| CN | 111582216 A | 8/2020 |
| CN | 111598095 A | 8/2020 |
| CN | 108229526 B | 9/2020 |

(56) References Cited

FOREIGN PATENT DOCUMENTS

| | | |
|---|---|---|
| CN | 111693972 A | 9/2020 |
| CN | 106558058 B | 10/2020 |
| CN | 107169560 B | 10/2020 |
| CN | 107622258 B | 10/2020 |
| CN | 111767801 A | 10/2020 |
| CN | 111768002 A | 10/2020 |
| CN | 111783545 A | 10/2020 |
| CN | 111783971 A | 10/2020 |
| CN | 111797657 A | 10/2020 |
| CN | 111814623 A | 10/2020 |
| CN | 111814902 A | 10/2020 |
| CN | 111860499 A | 10/2020 |
| CN | 111881856 A | 11/2020 |
| CN | 111882579 A | 11/2020 |
| CN | 111897639 A | 11/2020 |
| CN | 111898507 A | 11/2020 |
| CN | 111898523 A | 11/2020 |
| CN | 111899227 A | 11/2020 |
| CN | 112101175 A | 12/2020 |
| CN | 112101562 A | 12/2020 |
| CN | 112115953 A | 12/2020 |
| CN | 111062973 B | 1/2021 |
| CN | 111275080 B | 1/2021 |
| CN | 112183739 A | 1/2021 |
| CN | 112232497 A | 1/2021 |
| CN | 112288658 A | 1/2021 |
| CN | 112308095 A | 2/2021 |
| CN | 112308799 A | 2/2021 |
| CN | 112313663 A | 2/2021 |
| CN | 112329552 A | 2/2021 |
| CN | 112348783 A | 2/2021 |
| CN | 111899245 B | 3/2021 |
| DE | 202017102235 U1 | 5/2017 |
| DE | 202017102238 U1 | 5/2017 |
| DE | 102017116017 A1 | 1/2019 |
| DE | 102018130821 A1 | 6/2020 |
| DE | 102019008316 A1 | 8/2020 |
| EP | 1215626 B1 | 9/2008 |
| EP | 2228666 B1 | 9/2012 |
| EP | 2420408 B1 | 5/2013 |
| EP | 2723069 A1 | 4/2014 |
| EP | 2741253 A1 | 6/2014 |
| EP | 3115772 A1 | 1/2017 |
| EP | 2618559 B1 | 8/2017 |
| EP | 3285485 A1 | 2/2018 |
| EP | 2863633 B1 | 2/2019 |
| EP | 3113080 B1 | 5/2019 |
| EP | 3525132 A1 | 8/2019 |
| EP | 3531689 A1 | 8/2019 |
| EP | 3537340 A1 | 9/2019 |
| EP | 3543917 A1 | 9/2019 |
| EP | 3608840 A1 | 2/2020 |
| EP | 3657387 A1 | 5/2020 |
| EP | 2396750 B1 | 6/2020 |
| EP | 3664020 A1 | 6/2020 |
| EP | 3690712 A1 | 8/2020 |
| EP | 3690742 A1 | 8/2020 |
| EP | 3722992 A1 | 10/2020 |
| EP | 3690730 A2 | 11/2020 |
| EP | 3739486 A1 | 11/2020 |
| EP | 3501897 B1 | 12/2020 |
| EP | 3751455 A2 | 12/2020 |
| EP | 3783527 A1 | 2/2021 |
| GB | 2402572 B | 8/2005 |
| GB | 2548087 A | 9/2017 |
| GB | 2577485 A | 4/2020 |
| GB | 2517270 B | 6/2020 |
| JP | 2578262 Y2 | 8/1998 |
| JP | 3941252 B2 | 7/2007 |
| JP | 4282583 B2 | 6/2009 |
| JP | 4300098 B2 | 7/2009 |
| JP | 2015004922 A | 1/2015 |
| JP | 5863536 B2 | 2/2016 |
| JP | 6044134 B2 | 12/2016 |
| JP | 6525707 B2 | 6/2019 |
| JP | 2019101535 A | 6/2019 |
| JP | 2020101927 A | 7/2020 |
| JP | 2020173744 A | 10/2020 |
| KR | 100326702 B1 | 2/2002 |
| KR | 101082878 B1 | 11/2011 |
| KR | 101738422 B1 | 5/2017 |
| KR | 101969864 B1 | 4/2019 |
| KR | 101996167 B1 | 7/2019 |
| KR | 102022388 B1 | 8/2019 |
| KR | 102043143 B1 | 11/2019 |
| KR | 102095335 B1 | 3/2020 |
| KR | 102097120 B1 | 4/2020 |
| KR | 1020200085490 A | 7/2020 |
| KR | 102189262 B1 | 12/2020 |
| KR | 1020200142266 A | 12/2020 |
| TW | 200630819 A | 9/2006 |
| TW | I294089 B | 3/2008 |
| TW | I306207 B | 2/2009 |
| WO | WO 02/052835 | 7/2002 |
| WO | WO 16/032398 | 3/2016 |
| WO | WO 16/048108 | 3/2016 |
| WO | WO 16/207875 | 12/2016 |
| WO | WO 17/158622 | 9/2017 |
| WO | WO 19/005547 | 1/2019 |
| WO | WO 19/067695 | 4/2019 |
| WO | WO 19/089339 | 5/2019 |
| WO | WO 19/092456 | 5/2019 |
| WO | WO 19/099622 | 5/2019 |
| WO | WO 19/122952 | 6/2019 |
| WO | WO 19/125191 | 6/2019 |
| WO | WO 19/126755 | 6/2019 |
| WO | WO 19/144575 | 8/2019 |
| WO | WO 19/182782 | 9/2019 |
| WO | WO 19/191578 | 10/2019 |
| WO | WO 19/216938 | 11/2019 |
| WO | WO 19/220436 | 11/2019 |
| WO | WO 20/006154 | 1/2020 |
| WO | WO 20/012756 | 1/2020 |
| WO | WO 20/025696 | 2/2020 |
| WO | WO 20/034663 | 2/2020 |
| WO | WO 20/056157 | 3/2020 |
| WO | WO 20/076356 | 4/2020 |
| WO | WO 20/097221 | 5/2020 |
| WO | WO 20/101246 | 5/2020 |
| WO | WO 20/120050 | 6/2020 |
| WO | WO 20/121973 | 6/2020 |
| WO | WO 20/131140 | 6/2020 |
| WO | WO 20/139181 | 7/2020 |
| WO | WO 20/139355 | 7/2020 |
| WO | WO 20/139357 | 7/2020 |
| WO | WO 20/142193 | 7/2020 |
| WO | WO 20/146445 | 7/2020 |
| WO | WO 20/151329 | 7/2020 |
| WO | WO 20/157761 | 8/2020 |
| WO | WO 20/163455 | 8/2020 |
| WO | WO 20/167667 | 8/2020 |
| WO | WO 20/174262 | 9/2020 |
| WO | WO 20/177583 | 9/2020 |
| WO | WO 20/185233 | 9/2020 |
| WO | WO 20/185234 | 9/2020 |
| WO | WO 20/195658 | 10/2020 |
| WO | WO 20/198189 | 10/2020 |
| WO | WO 20/198779 | 10/2020 |
| WO | WO 20/205597 | 10/2020 |
| WO | WO 20/221200 | 11/2020 |
| WO | WO 20/240284 | 12/2020 |
| WO | WO 20/260020 | 12/2020 |
| WO | WO 20/264010 | 12/2020 |
| WO | WO-2020/245654 A1 | 12/2020 |

OTHER PUBLICATIONS

"Simultaneous End-to-End Vehicle and License Plate Detection With Multi-Branch Attention Neural Network" by Song-Lu Chen et al. IEEE Transactions on Intelligent Transportation Systems, vol. 21, No. 9, Sep. 2020 (Year: 2020).*

Li, M.; Hu, Y.; Zhao, N.; Qian, Q. One-Stage Multi-Sensor Data Fusion Convolutional Neural Network for 3D Object Detection.

(56) References Cited

OTHER PUBLICATIONS

Sensors 2019, 19, 1434. https://doi.org/10.3390/s19061434 (Year: 2019).*
"SINet: A Scale-Insensitive Convolutional Neural Network for Fast Vehicle Detection" by Xiaowei Hu et al. IEEE Transactions on Intelligent Transportation Systems, vol. 20, No. 3, Mar. 2019 (Year: 2019).*
Düzçeker, Arda, et al. "DeepVideoMVS: Multi-View Stereo on Video with Recurrent Spatio-Temporal Fusion." arXiv preprint arXiv:2012.02177 (2021). (Year: 2021).*
International Search Report and Written Opinion on PCT Appl. No. PCT/US2022/040784 dated Dec. 7, 2022 (15 pages).
International Search Report and Written Opinion on PCT Appl. No. PCT/US2022/040793 dated Nov. 30, 2022 (17 pages).
International Search Report and Written Opinion on PCT Appl. No. PCT/US2022/040906 dated Nov. 18, 2022 (16 pages).
International Preliminary Report on Patentability on PCT/US2022/040784 Dtd Feb. 29, 2024 (10 pages).
International Preliminary Report on Patentability on PCT/US2022/040906 Dtd Feb. 29, 2024 (9 pages).
International Preliminary Report on Patentability on PCT/US2022/040793 Dtd Feb. 29, 2024 (10 pages).
ISR and WO on PCT patent application No. PCT/US2022/040793 dated Oct. 25, 2023 (30 pages).
U.S. Appl. No. 17/820,849, filed Aug. 18, 2022, Carvalho et al.

\* cited by examiner

VISION-BASED MACHINE LEARNING MODEL FOR AUTONOMOUS DRIVING WITH ADJUSTABLE VIRTUAL CAMERA

CROSS-REFERENCE TO RELATED APPLICATIONS

This application claims priority to U.S. Prov. Patent App. No. 63/260,439 titled "ENHANCED SYSTEMS AND METHODS FOR AUTONOMOUS VEHICLE OPERATION AND TRAINING" and filed on Aug. 19, 2021. This application claims priority to U.S. Prov. Patent App. No. 63/287,936 titled "ENHANCED SYSTEMS AND METHODS FOR AUTONOMOUS VEHICLE OPERATION AND TRAINING" and filed on Dec. 9, 2021. This application additionally claims priority to U.S. Prov. Patent App. No. 63/365,078 titled "VISION-BASED MACHINE LEARNING MODEL FOR AUTONOMOUS DRIVING WITH ADJUSTABLE VIRTUAL CAMERA" and filed on May 20, 2022. Each of the above-recited applications is hereby incorporated herein by reference in its entirety.

BACKGROUND

Technical Field

The present disclosure relates to machine learning models, and more particularly, to machine learning models using vision information.

Description of Related Art

Neural networks are relied upon for disparate uses and are increasingly forming the underpinnings of technology. For example, a neural network may be leveraged to perform object classification on an image obtained via a user device (e.g., a smart phone). In this example, the neural network may represent a convolutional neural network which applies convolutional layers, pooling layers, and one or more fully-connected layers to classify objects depicted in the image. As another example, a neural network may be leveraged for translation of text between languages. For this example, the neural network may represent a recurrent-neural network.

Complex neural networks are additionally being used to enable autonomous or semi-autonomous driving functionality for vehicles. For example, an unmanned aerial vehicle may leverage a neural network, in part, to enable navigation about a real-world area. In this example, the unmanned aerial vehicle may leverage sensors to detect upcoming objects and navigate around the objects. As another example, a car or truck may execute neural network(s) to navigate about a real-world area. At present, such neural networks may rely upon costly, or error-prone, sensors. Additionally, such neural networks may lack accuracy with respect to detecting and classifying moving and stationary (e.g., fixed) objects causing deficient autonomous or semi-autonomous driving performance.

Figure 1A:
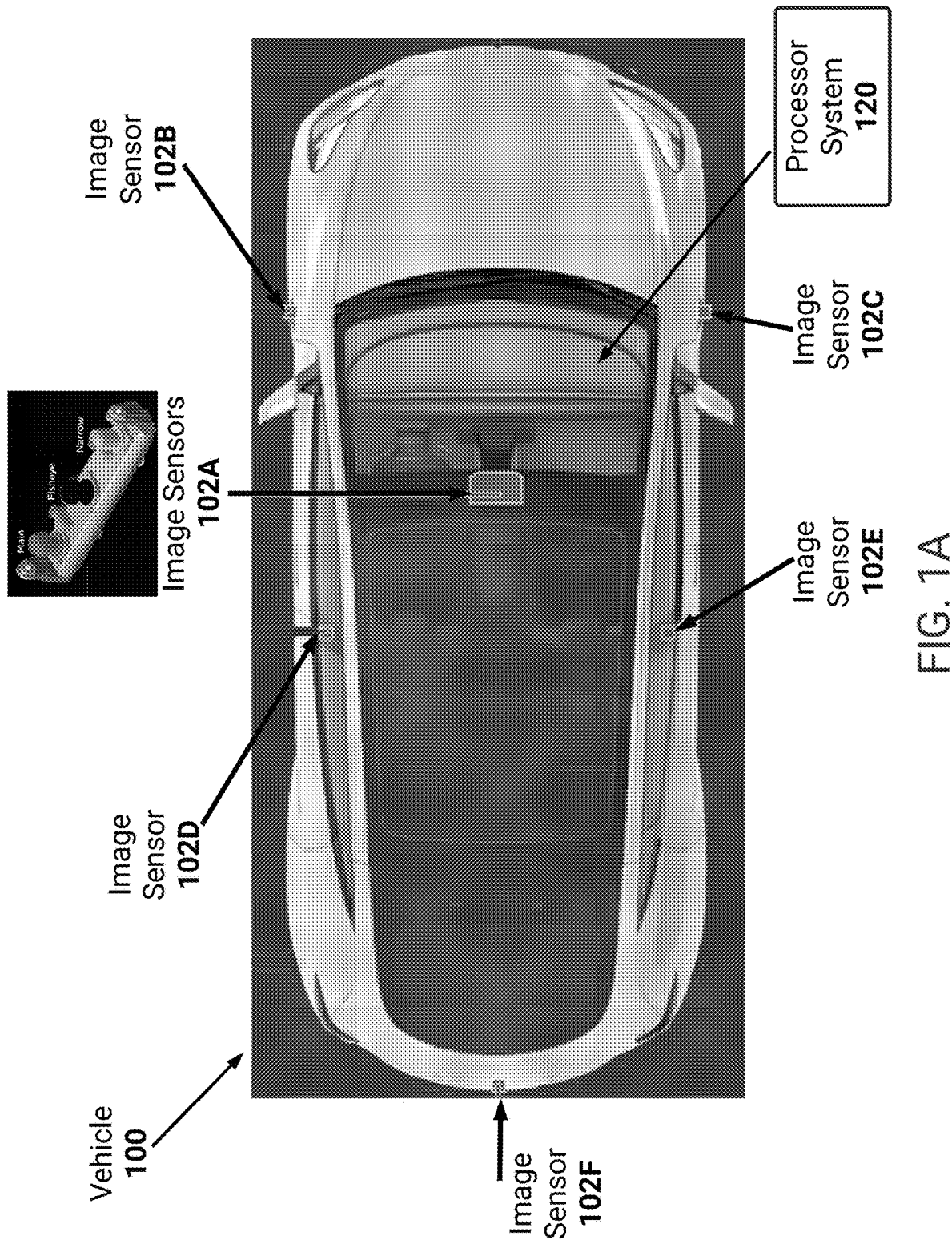
FIG. 1A is a block diagram illustrating an example autonomous or semi-autonomous vehicle which includes a multitude of image sensors an example processor system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Introduction

This application describes enhanced techniques for autonomous or semi-autonomous (collectively referred to herein as autonomous) driving of a vehicle using image sensors (e.g., cameras) positioned about the vehicle. Thus, the vehicle may navigate about a real-world area using vision-based sensor information. As may be appreciated, humans are capable of driving vehicles using vision and a deep understanding of their real-world surroundings. For example, humans are capable of rapidly identifying objects (e.g., pedestrians, road signs, lane markings, vehicles) and using these objects to inform driving of vehicles. Increasingly, machine learning models are capable of identifying and characterizing objects positioned about vehicles. However, such machine learning models leverage disparate sensors which add complexity, and are prone to error, while also complication manufacturing of vehicles.

This application therefore describes a vision-based machine learning model which relies upon increased software complexity to enable a reduction in sensor-based hardware complexity while enhancing accuracy. For example, only image sensors may be used in some embodiments. Through use of image sensors, such as cameras, the described model enables a sophisticated simulacrum of human vision-based driving. As will be described, the machine learning model may obtain images from the image sensors and combine (e.g., stitch or fuse) the information included therein. For example, the information may be combined into a vector space which is then further processed by the machine learning model to extract objects, signals associated with the objects, and so on.

In contrast, another example technique may include identifying objects included in images from each image sensor. These objects may then be aggregated to determine a consistent set of objects in the images. For example, a first image sensor (e.g., a left image sensor) may depict a portion of a truck positioned to the left of a vehicle. In this example, a second image sensor (e.g., a front wide-angle sensor) may include another portion of the truck. Thus, this example technique may require that the portions of the truck be separately identified and then combined into a view of the truck. Such a combination may rely upon hand-tuned models and code which may introduce errors and be difficult to update. In contrast, the techniques described herein allow for the machine learning model to detect objects based on the vector space described above.

Furthermore, and as will be described, to limit occlusion of objects and ensure substantial range of visibility of objects, the information may be projected based on a common virtual camera. By way of simplifying the explanation, the objects may be positioned in the vector space according to their position as would be seen by the common virtual camera. For example, the virtual camera may be set at a certain height above a vehicle which is obtaining images. In this example, the vector space may depict objects proximate to the vehicle as would be seen by a camera at that height (e.g., pointing forward or angled-forward).

Advantageously, the machine learning model described herein may include separate portions, or branches, which are focused on vulnerable road users (VRUs) and non-VRUs. In this specification, a VRU may include a pedestrian, a baby carriage, a stroller, a skateboarder, and so on. A non-VRU may include a car, a truck, a semi-truck, an emergency vehicle, ambulance, and so on. Thus, these different branches may focus on, and be experts in, specifics related to vehicles or pedestrians. As will be described, the machine learning model may project the VRUs into a vector space in which the virtual camera is set at a first height (e.g., 1 meter, 1.5 meters, 2 meters, and so on). In this way, pedestrians may be viewed by the machine learning model at about human height to ensure proper detection and characterization. The machine learning model may, in contrast, project non-VRUs into a vector space in which the vector camera is set a second height (e.g., 13 meters, 15 meters, 20 meters, and so on). In some embodiments, the second height may be greater than 1 meter, 1.5 meters, 2 meters, and so on, and less than 13 meters, 15 meters, 20 meters, 25 meters, 30 meters, and so on. In this way, non-VRUs may be viewed by the machine learning model at a raised height to allow for a reduction in object occlusions while preserving substantial maximum range of detection of objects.

In some embodiments, the virtual camera for the VRU and non-VRU branches or networks may encompass a 360-degree horizontal angle field of view and from 0 degrees to 90 degrees below the horizontal line at its respective height. For example, the non-VRU branch may project non-VRU objects into a vector space for which the virtual camera is at 20 meters, 21 meters, 25 meters, and so on, and encompasses a 360-degree horizontal angle field of view and from 0 degrees to 90 degrees. In some embodiments, the VRU network may project VRU objects into a vector space for which the virtual camera is at 1.5 meters, 1.8 meters, height and so on with a 360-degree horizontal angle field of view and a field of view from 20 degrees above the horizontal line to 45 degrees below the horizontal line at the height. In some embodiments, the horizontal angle field of view may be 330 degrees, 320 degrees, 300 degrees, and so on.

Another example technique may rely upon a birds-eye view of objects positioned about a vehicle. For example, the birds-eye view may view objects as would be positioned based on a virtual camera pointing downwards at a substantial height. However, the birds-eye view may limit a range associated with detecting objects proximate to the vehicle. For example, this view may only include objects within a threshold distance of the vehicle which would by seen by the virtual camera. This may reduce the ability of the vehicle to autonomously drive as new objects may quickly pop into the birds-eye view, for example at higher speeds.

For certain types of objects, however, the birds-eye view may be advantageous to an understanding of the real-world environment. For example, static objects or static information may benefit from this view. Example static objects or information may include lane markings, crosswalks, bike lanes, direction of travel for a road or lane therein, intersections, connectivity between lanes which are separated via an intersection, and so on. As may be appreciated, the birds-eye view may allow for a rapid understanding of important elements which are relied upon to effectuate autonomous driving. Indeed, stationary objects may inform the outlines of what is navigable in a real-world environment. For example, lane markings can be included in the birds-eye view as would be seen on a navigation map. In this example, the lane markings may be relied upon to inform future navigation options which are available to an autonomous vehicle. As another example, a bike-lane may be identified in the birds-eye view. For this example, the route of the bike-lane may be determined based on the image sensors positioned about the vehicle and updated as the autonomous vehicle navigates. In this way, and as one example, the vehicle may monitor for locations at which the bike-lane merges with vehicle lanes.

However, for objects which are not expected to be fixed (e.g., vehicles, pedestrians, and so on), use of the birds-eye view may be limiting. For example, the range of objects may be limited to the area encompassed by the birds-eye view. As another example, the objects themselves will be depicted in a manner which is unnatural to their understanding. In contrast to lane markings, an overhead view of a pedestrian may limit an understanding of the pedestrian's actions. Additionally, this view depicts the pedestrian in the vector space as smaller than would be seen by a driver. Similarly, vehicles may be projected into the vector space in which the virtual camera is set at a greater height than that used for pedestrians. The greater height may allow for a reduction in object occlusions while preserving range of detection of objects.

Thus, in some embodiments the machine learning model described herein may be relied upon for detection, determination, identifying, and so on, of VRUs and non-VRUs. A birds-eye view network may be relied upon for detection, determination, identifying, and so on, of static objects. The outputs of the described model and the birds-eye view network may be used by, for example, a planning and/or navigation model or engine to effectuate autonomous or semi-autonomous driving. Additional description related to the birds-eye view network is included in U.S. Patent Prov. App. No. 63/260,439 which is hereby incorporated herein by reference.

The machine learning model described herein may include disparate elements which, in some embodiments, may be end-to-end trained. As will be described, images from image sensors may be provided to respective backbone networks. In some embodiments, these backbone networks may be convolutional neural networks which output feature maps for use later in the network. For the non-VRU branch, a transformer network, such as a self-attention network, may receive the feature maps and transform the information into an output vector space. For example, the output vector space may be associated with a virtual camera at a first height. For the VRU-branch, a fixed projection may be used to transform the information into an output vector space associated with a second height. Video modules (e.g., video queues) may receive output from the VRU and non-VRU branches. Trunks or heads of the machine learning model may obtain output from the video modules and determine output information reflecting information associated with objects.

The video modules may advantageously aggregate information which is indexed according to time. As may be appreciated, vehicles and pedestrians may be expected to be temporally variable in actions and positions. For example, a vehicle proximate to an autonomous vehicle may be expected to adjust its speed, lane position, and execute actions such as turning on brake lights, turn signals, having a door opened, and so on. In contrast, static features (e.g., lane markings) may not be expected to be temporally variable. Thus, information, such as features, may be temporally indexed. In this way, the movement, positions, and other temporal characteristics, of objects positioned about the autonomous vehicle may be aggregated for use by the trunks or heads.

Therefore, the disclosed technology allows for enhancements to autonomous driving models while reducing sensor-complexity. For example, other sensors (e.g., radar, Lidar, and so on) may be removed during operation of the vehicles described herein. As may be appreciated, radar may introduce faults during operation of vehicles which may lead to phantom objects being detected. Additionally, lidar may introduce errors in certain weather conditions and lead to substantial manufacturing complexity in vehicles.

While description related to an autonomous vehicle (e.g., a car) is included herein, as may be appreciated the techniques may be applied to other autonomous vehicles. For example, the machine learning model described herein may be used, in part, to autonomously operate unmanned ground vehicles, unmanned aerial vehicles, and so on. Additionally, reference to an autonomous vehicle may, in some embodiments, represent a vehicle which may be placed into an autonomous driving mode. For example, the vehicle may autonomously drive or navigate on a highway, freeway, and so on. In some embodiments, the vehicle may autonomously drive or navigate on city roads.

Block Diagram—Vehicle Processing System

FIG. 1A is a block diagram illustrating an example autonomous vehicle 100 which includes a multitude of image sensors 102A-102F an example processor system 120. The image sensors 102A-102F may include cameras which are positioned about the vehicle 100. For example, the cameras may allow for a substantially 360-degree view around the vehicle 100.

The image sensors 102A-102F may obtain images which are used by the processor system 120 to, at least, determine information associated with objects positioned proximate to the vehicle 100. The images may be obtained at a particular frequency, such as 30 Hz, 36 Hz, 60 Hz, 65 Hz, and so on. In some embodiments, certain image sensors may obtain images more rapidly than other image sensors. As will be described below, these images may be processed by the processor system 120 based on the vision-based machine learning model described herein.

Image sensor A 102A may be positioned in a camera housing near the top of the windshield of the vehicle 100. For example, the image sensor A 102A may provide a forward view of a real-world environment in which the vehicle is driving. In the illustrated embodiment, image sensor A 102A includes three image sensors which are laterally offset from each other. For example, the camera housing may include three image sensors which point forward. In this example, a first of the image sensors may have a wide-angled (e.g., fish-eye) lens. A second of the image sensors may have a normal or standard lens (e.g., 35 mm equivalent focal length, 50 mm equivalent, and so on). A third of the image sensors may have a zoom or narrow-view lens. In this way, three images of varying focal lengths may be obtained in the forward direction by the vehicle 100.

Image sensor B 102B may be rear-facing and positioned on the left side of the vehicle 100. For example, image sensor B 102B may be placed on a portion of the fender of the vehicle 100. Similarly, Image sensor C 102C may be rear-facing and positioned on the right side of the vehicle 100. For example, image sensor C 102C may be placed on a portion of the fender of the vehicle 100.

Image sensor D 102D may be positioned on a door pillar of the vehicle 100 on the left side. This image sensor 102D may, in some embodiments, be angled such that it points downward and, at least in part, forward. In some embodiments, the image sensor 102D may be angled such that it points downward and, at least in part, rearward. Similarly, image sensor E 102E may be positioned on a door pillow of the vehicle 100 on the right side. As described above, image sensor E 102E may be angled such that it points downwards and either forward or rearward in part.

Image sensor F 102F may be positioned such that it points behind the vehicle 100 and obtains images in the rear direction of the vehicle 100 (e.g., assuming the vehicle 100 is moving forward). In some embodiments, image sensor F 102F may be placed above a license plate of the vehicle 100.

While the illustrated embodiments include image sensors 102A-102F, as may be appreciated additional, or fewer, image sensors may be used and fall within the techniques described herein.

The processor system 120 may obtain images from the image sensors 102A-102F and detect objects, and signals associated with the objects, using the vision-based machine learning model described herein. Based on the objects, the processor system 120 may adjust one or more driving characteristics or features. For example, the processor system 120 may cause the vehicle 100 to turn, slow down, brake, speed up, and so on. While not described herein, as may be appreciated the processor system 120 may execute one or more planning and/or navigation engines or models which use output from the vision-based machine learning model to effectuate autonomous driving.

In some embodiments, the processor system 120 may include one or more matrix processors which are configured to rapidly process information associated with machine learning models. The processor system 120 may be used, in some embodiments, to perform convolutions associated with forward passes through a convolutional neural network. For example, input data and weight data may be convolved. The processor system 120 may include a multitude of multiply-accumulate units which perform the convolutions. As an example, the matrix processor may use input and weight data which has been organized or formatted to facilitate larger convolution operations.

For example, input data may be in the form of a three-dimensional matrix or tensor (e.g., two-dimensional data across multiple input channels). In this example, the output data may be across multiple output channels. The processor system 120 may thus process larger input data by merging, or flattening, each two-dimensional output channel into a vector such that the entire, or a substantial portion thereof, channel may be processed by the processor system 120. As another example, data may be efficiently re-used such that weight data may be shared across convolutions. With respect to an output channel, the weight data 106 may represent weight data (e.g., kernels) used to compute that output channel.

Additional example description of the processor system, which may use one or more matrix processors, is included in U.S. Pat. Nos. 11,157,287, 11,409,692, and 11,157,441, which are hereby incorporated by reference in their entirety and form part of this disclosure as if set forth herein.

Figure 1B:
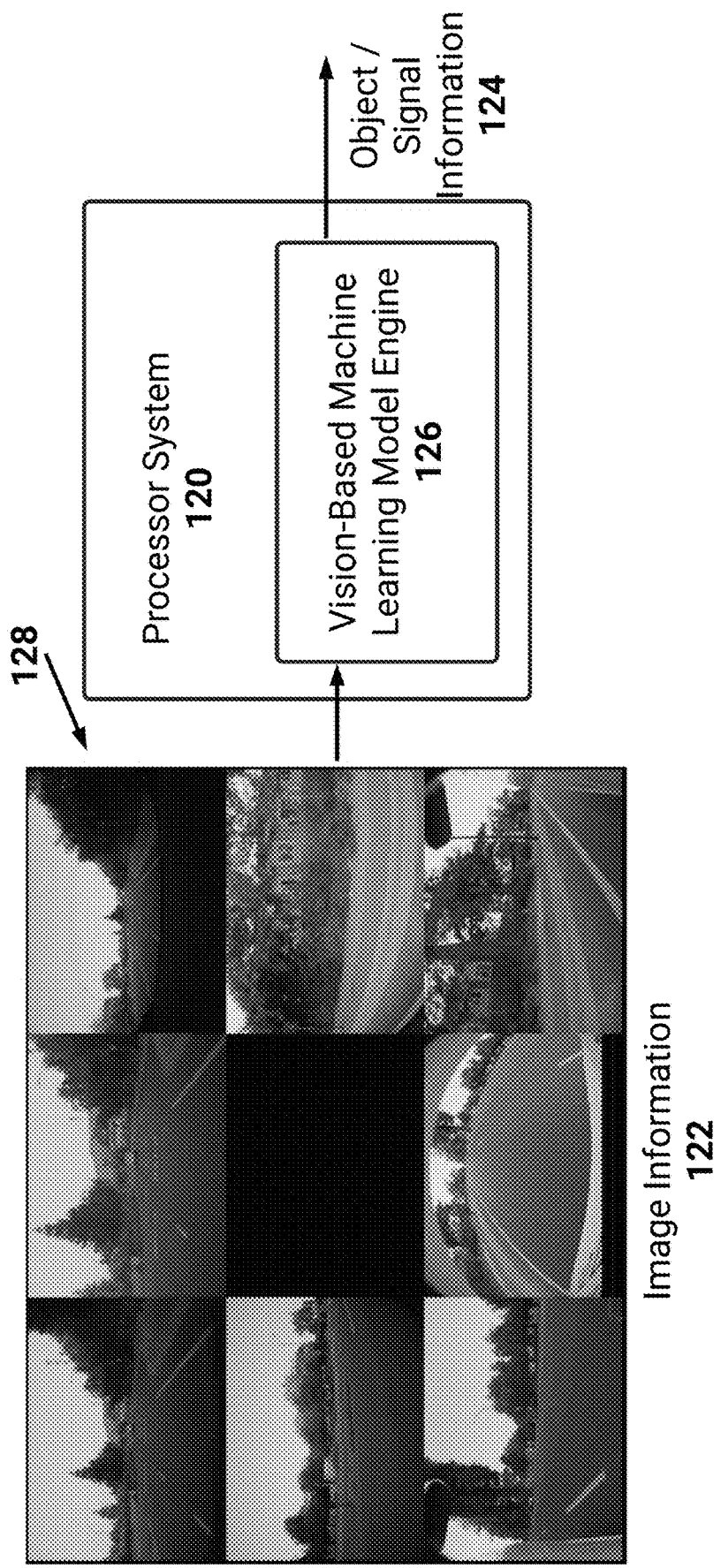
FIG. 1B is a block diagram illustrating the example processor system determining object/signal information based on received image information from the example image sensors.

FIG. 1B is a block diagram illustrating the example processor system 120 determining object/signal information 124 based on received image information 122 from the example image sensors.

The image information 122 includes images from image sensors positioned about a vehicle (e.g., vehicle 100). In the illustrated example of FIG. 1A, there are 8 image sensors and thus 8 images are represented in FIG. 1B. For example, a top row of the image information 122 includes three images from the forward-facing image sensors. As described above, the image information 122 may be received at a particular frequency such that the illustrated images represent a particular time stamp of images. In some embodiments, the image information 122 may represent high dynamic range (HDR) images. For example, different exposures may be combined to form the HDR images. As another example, the images from the image sensors may be pre-processed to convert them into HDR images (e.g., using a machine learning model).

In some embodiments, each image sensor may obtain multiple exposures each with a different shutter speed or integration time. For example, the different integration times may be greater than a threshold time difference apart. In this example, there may be three integration times which are, in some embodiments, about an order of magnitude apart in time. The processor system 120, or a different processor, may select one of the exposures based on measures of clipping associated with images. In some embodiments, the processor system 120, or a different processor may form an image based on a combination of the multiple exposures. For example, each pixel of the formed image may be selected from one of the multiple exposures based on the pixel not including values (e.g., red, green, blue) values which are clipped (e.g., exceed a threshold pixel value).

The processor system 120 may execute a vision-based machine learning model engine 126 to process the image information 122. An example of the vision-based machine learning model is described in more detail below, with respect to FIGS. 2-4B. As described herein, the vision-based machine learning model may combine information included in the images. For example, each image may be provided to a particular backbone network. In some embodiments, the backbone networks may represent convolutional neural networks. Outputs of these backbone networks may then, in some embodiments, be combined (e.g., formed into a tensor) or may be provided as separate tensors to one or more further portions of the model. In some embodiments, an attention network (e.g., cross-attention) may receive the combination or may receive input tensors associated with each image sensor. The combined output, as will be described, may then be provided to different branches which are respectively associated with vulnerable road users (VRUs) and non-VRUs.

As illustrated in FIG. 1B, the vision-based machine learning model engine 126 may output object/signal information 124. This information 124 may represent information identifying objects depicted in the image information 122. For example, the information 122 may include one or more of positions of the objects (e.g., information associated with cuboids about the objects), velocities of the objects, accelerations of the objects, types or classifications of the objects, whether a car object has its door open, and so on. Examples of the object/signal information 124 are described below, with respect to FIG. 2.

With respect to cuboids, example information 122 may include location information (e.g., with respect to a common virtual space or vector space), size information, shape information, and so on. For example, the cuboids may be three-dimensional. Example information 122 may further include whether an object is crossing into a lane or merging. Pedestrian information (e.g., position, direction), lane assignment information, whether an object is doing a U-turn, stopped for traffic, is parked, and so on.

Additionally, and as will be described, the vision-based machine learning model engine 126 may process multiple images spread across time. For example, video modules may be used to analyze images (e.g., the feature maps produced thereof, for example by the backbone networks or subsequently in the vision-based machine learning model) which are selected from within a prior threshold amount of time (e.g., 3 seconds, 5 seconds, 15 seconds, an adjustable amount of time, and so on). In this way, objects may be tracked over time such that the processor system 120 monitors their location even when temporarily occluded.

In some embodiments, the vision-based machine learning model engine 126 may output information which forms one or more images. Each image may encode particular information, such as locations of objects. For example, bounding boxes of objects positioned about an autonomous vehicle may be formed into an image. In some embodiments, the projections 322 and 422 of FIGS. 3B and 4B may be images generated by the vision-based machine learning model.

Figure 2:
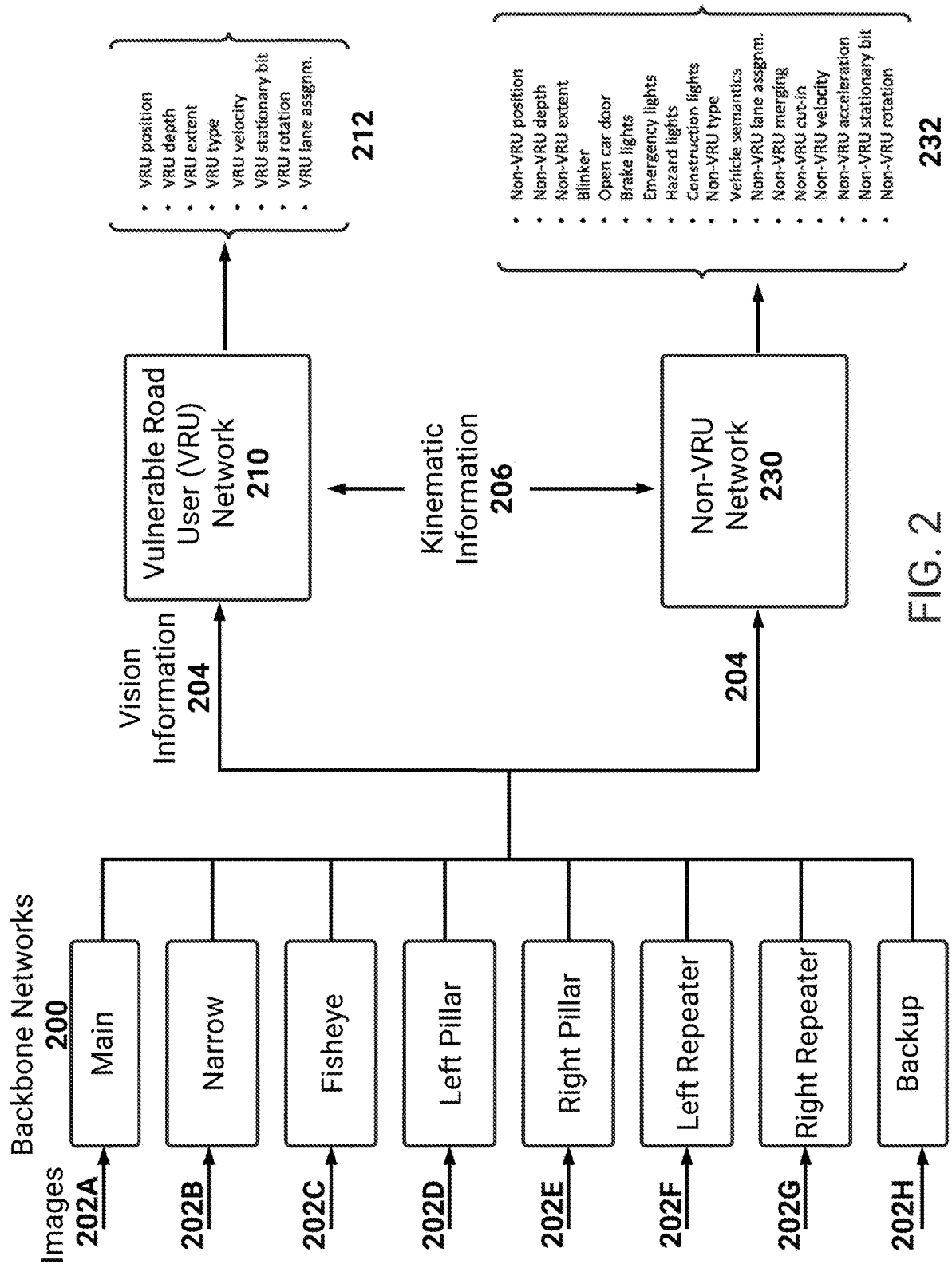
FIG. 2 is a block diagram of an example vision-based machine learning model which includes a vulnerable road user (VRU) branch a non-VRU branch.

FIG. 2 is a block diagram of an example vision-based machine learning model which includes a vulnerable road user (VRU) network 210 a non-VRU network 230. The example model may be executed by an autonomous vehicle, such as vehicle 100. Thus, actions of the model may be understood to be performed by a processor system (e.g., system 120) included in the vehicle. In FIG. 2, the machine learning model thus includes separate branches for pedestrians and vehicles. In this way, each branch may be trained to focus on either VRU objects or non-VRU objects.

As may be appreciated, a pedestrian may typically move at a slower velocity than a vehicle and take distinct actions as compared to vehicles. For example, a pedestrian may cross the street from a sidewalk, walk along the sidewalk, and so on. In contrast, a vehicle may have its door open on the side of the road, the vehicle may be applying brakes which are detectable via rear lights of the vehicle, and so on. Thus, the branches may be trained to determine specifics which are more accurate for pedestrians and vehicles. For example, and as described below, velocity for a pedestrian may be an allocentric velocity. In this example, the velocity may represent an actual velocity of the pedestrian. In contrast, velocity for a vehicle may represent an egocentric velocity. In this example, the velocity may represent a relative velocity to an autonomous vehicle executing the vision-based machine learning model.

In the illustrated example, images 202A-202H are received by the vision-based machine learning model. These images 202A-202H may be obtained from image sensors positioned about the vehicle, such as image sensors 102A-102F. The vision-based machine learning model includes backbone networks 200 which receive respective images as input. Thus, the backbone networks 200 process the raw pixels included in the images 202A-202H. In some embodiments, the backbone networks 200 may be convolutional neural networks. For example, there may be 5, 10, 15, and so on, convolutional layers in each backbone network.

In some embodiments, the backbone networks 200 may include residual blocks, recurrent neural network-regulated residual networks, and so on. Additionally, the backbone networks 200 may include weighted bi-directional feature pyramid networks (BiFPN). Output of the BiFPNs may represent multi-scale features determined based on the images 202A-202H. In some embodiments, Gaussian blur may be applied to portions of the images at training and/or inference time. For example, road edges may be peaky in that they are sharply defined in images. In this example, a Gaussian blur may be applied to the road edges to allow for bleeding of visual information such that they may be detectable by a convolutional neural network.

Additionally, certain of the backbone networks 200 may pre-process the images such as performing rectification, cropping, and so on. With respect to cropping, images 202C from the fisheye forward-facing lens may be vertically cropped to remove certain elements included on a windshield (e.g., a glare shield).

With respect to rectification, the vehicles described herein may be examples of vehicles which are available to millions, or more, end-users. Due to tolerances in manufacturing and/or differences in use of the vehicles, the image sensors in the vehicles may be angled, or otherwise positioned, slightly differently (e.g., differences in roll, pitch, and/or yaw). Additionally, different models of vehicles may execute the same vision-based machine learning model. These different models may have the image sensors positioned and/or angled differently. The vision-based machine learning model described herein may be trained, at least in part, using information aggregated from the vehicle fleet used by end-users. Thus, differences in point of view of the images may be evident due to the slight distinctions between the angles, or positions, of the image sensors in the vehicles included in the vehicle fleet.

Thus, rectification may be performed via the backbone networks 200 to address these differences. For example, a transformation (e.g., an affine transformation) may be applied to the images 202A-202H, or a portion thereof, to normalize the images. In this example, the transformation may be based on camera parameters associated with the image sensors (e.g., image sensors 102A-102F), such as extrinsic and/or intrinsic parameters. In some embodiments, the image sensors may undergo an initial, and optionally repeated, calibrated step. For example, as a vehicle drives the cameras may be calibrated to ascertain camera parameters which may be used in the rectification process. In this example, specific markings (e.g., road lines) may be used to inform the calibration. The rectification may optionally represent one or more layers of the backbone networks 200, in which values for the transformation are learned based on training data.

The backbone networks 200 may thus output feature maps (e.g., tensors) which are used by VRU network 210 and non-VRU network 230. In some embodiments, the output from the backbone networks 200 may be combined into a matrix or tensor. In some embodiments, the output may be provided as a multitude of tensors (e.g., 8 tensors in the illustrated example) to the VRU network 210 and non-VRU network 230. In the illustrated example, the output is referred to as vision information 204 which is input into the networks 210, 230.

The output tensors from the backbone networks 200 may be combined (e.g., fused) together into respective virtual camera spaces (e.g., a vector space) via the VRU 210 and non-VRU network 230. The image sensors positioned about the autonomous vehicle may be at different heights of the vehicle. For example, the left and rear pillar image sensors may be positioned higher than the left and rear front bumper image sensors. Thus, to allow for a consistent view of objects positioned about the vehicle, the virtual camera space may be used. As described above, the VRU network 210 and non-VRU network 230 may use different virtual camera spaces. For example, the non-VRU network 210 may project the objects into a periscope space in which a virtual camera is positioned at a first height (e.g., 15 meters, 20 meters, and so on). As another example, the non-VRU network 230 may project the objects into a panoramic space in which a virtual camera is positioned at a second height (e.g., 1 meter, 1.5 meters, 2 meters, and so on).

For certain information determined by the vision-based machine learning model, the autonomous vehicle's kinematic information 206 may be used. Example kinematic information 206 may include the autonomous vehicles velocity, acceleration, yaw rate, and so on. In some embodiments, the images 202A-202H may be associated with kinematic information 206 determined for a time, or similar time, at which the images 202A-202H were obtained. For example, the kinematic information 206, such as velocity, yaw rate, acceleration, may be encoded (e.g., embedded into latent space), and associated with the images.

With respect to determining velocity of a non-VRU object, such as a vehicle, the vision-based machine learning model may thus use the autonomous vehicle's own velocity when determining the object's relative velocity. In addition, the non-VRU network 210 may process images at a particular frame rate. Thus, sequential images may be obtained which are at a same, or substantially same, time delt apart. Based on this information, the non-VRU network 210 may be trained to estimate the relative velocity of the non-VRU object. Similarly, VRU objects may be determined based on the autonomous vehicle's velocity in addition to time information associated with the particular frame rate.

Example output 212, 232, from the VRU network 210 and non-VRU network 230 are illustrated in FIG. 2. The output may represent information associated with objects, such as location (e.g., position with a virtual camera space), depth, and so on. For example, the information may relate to cuboids associated with objects positioned about the autonomous vehicle. The output may also represent signals which are utilized by the processor system to autonomous drive the autonomous vehicle. Example signals may include lane assignment, whether a vehicle has its door open, a particular lane in which a vehicle is located, whether a vehicle is cutting into the autonomous vehicle's lane, and so on. As may be appreciated, the vision-based machine learning model may be updated to determine additional signals and the illustrated signals should not be considered exhaustive.

The output 212, 232, may be generated via a forward pass through the networks 210, 213. In some embodiments, forward passes may be computed at a particular frequency (e.g., 24 Hz, 30 Hz, and so on). In some embodiments, the output may be used, for example, via a planning engine. As an example, the planning engine may determine driving actions to be performed by the autonomous vehicle (e.g., accelerations, turns, braking, and so on) based on the periscope and panoramic views of the real-world environment.

Further detail regarding the VRU network 210 and non-VRU network 230 is included below with respect to FIGS. 3A-4B.

Figure 3A:
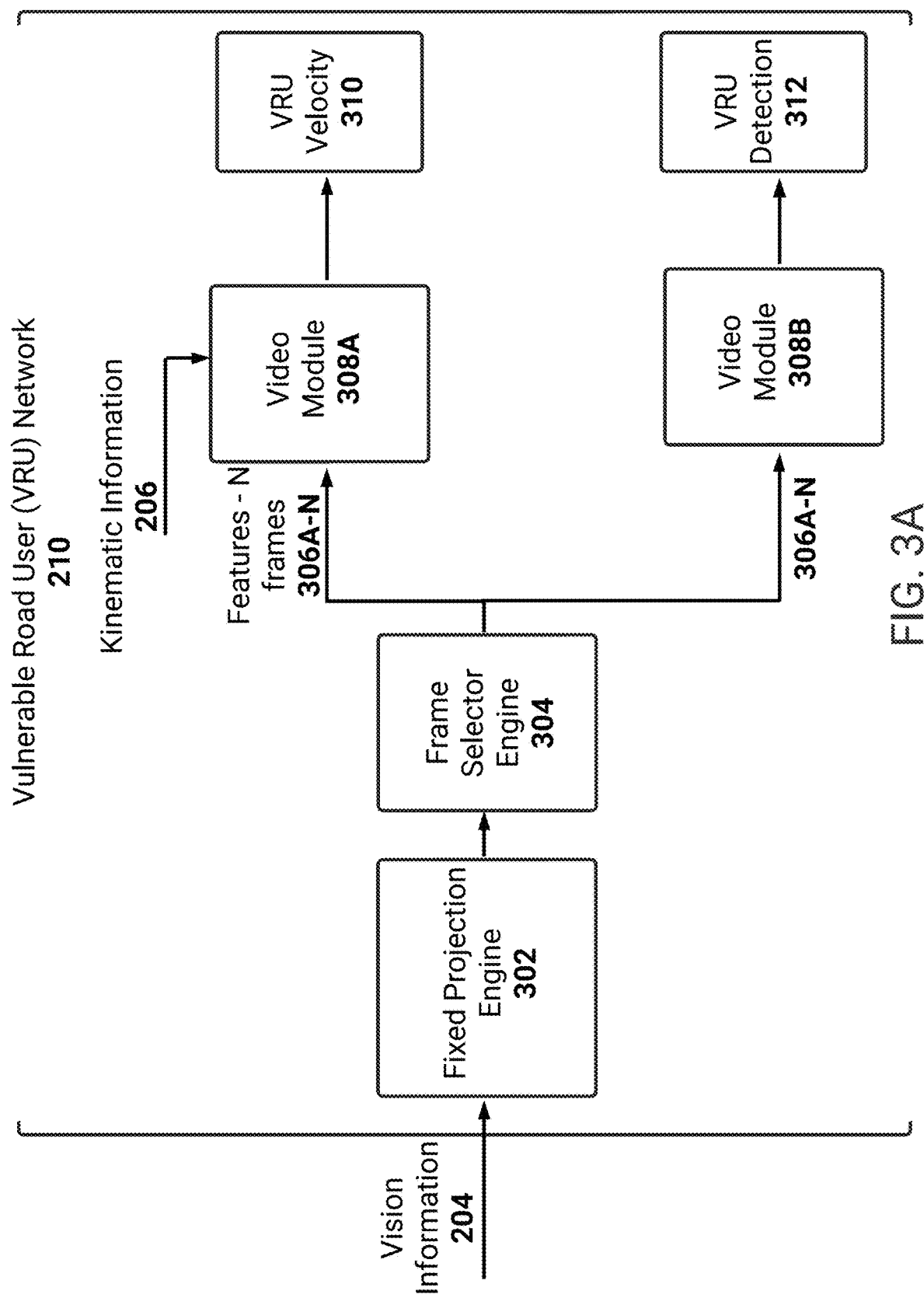
FIG. 3A is a block diagram of the VRU branch.

FIG. 3A is a block diagram of the VRU network 210. As described in FIG. 2, the VRU network 210 may be used to determine information associated with pedestrians or other vulnerable objects (e.g., baby strollers, skateboarders, and so on). In the illustrated example, vision information 204 from the backbone networks (e.g., networks 200) is provided as input into a fixed projection engine 302.

The fixed projection engine 302 may project information into a virtual camera space associated with a virtual camera. As described above, the virtual camera may be positioned at 1 meter, 1.5 meters, 2.5 meters, and so on, above an autonomous vehicle executing the vision-based machine learning model. Without being constrained by way of theory, it may be appreciated that pixels of input images may be mapped into the virtual camera space. For example, a lookup table may be used in combination with extrinsic and intrinsic camera parameters associated with the image sensors (e.g., image sensors 102A-102F).

As an example, each pixel may be associated with a depth in the virtual camera space. Each pixel may represent a ray out of an image, with the ray extending in the virtual camera space. For a given pixel, a depth may be assumed or otherwise identified. With respect to the ray, the fixed projection engine 302 may identify two different depths along the ray from the given pixel. In some embodiments, these depths may be at 5 meters and at 50 meters. In other embodiments, the depths may be at 3 meters, 7 meters, 45 meters, 52 meters, and so on. The processor system 120 may then form the virtual camera space based on combinations of these rays for the pixels of the images. As may be appreciated, the position of a pixel in an input image may substantially correspond with a position in a tensor or tensors which form the vision information 204.

In some embodiments, the vector space may be warped by the VRU network 210 such that portions of the three-dimensional vector space are enlarged. For example, objects depicted in a view of a real-world environment as seen by a camera positioned at 1.5 meters, 2 meters, and so on may be warped by the VRU network 210. The vector space may be warped such that portions of interest may be enlarged or otherwise made more prominent. For example, the width dimension and height dimension may be warped to elongate VRU objects. In this example, a pedestrian represented in the vector space may thus be elongated. To effectuate this warping, training data may be used where the labeled output is object positions which have been adjusted according to the warping. Additionally, the fixed projection engine 302 may warp, for example, the height dimension to ensure that VRU objects are enlarged according to at least one dimension. In some embodiments, one or more variables associated with the warping may be hyperparameters selected for use in the non-VRU network 230.

Output from the fixed projection engine 302 is provided as input to the frame selector engine 304. To ensure that objects are able to be tracked through time, even while temporarily occluded, the vision-based machine learning model can utilize a multitude of frames during a forward pass through the model. For example, each frame may be associated with a time, or short range of times, at which the image sensors are triggered to obtain images. Thus, the frame selector engine 304 may select vision information 204 which corresponds to images taken at different times within a prior threshold amount of time.

For example, the vision information 204 may be output by the processor system 120 at a particular frame rate (e.g., 20 Hz, 24 Hz, 30 Hz). The vision information 204, subsequent to the fixed projection engine 302, may then be queued or otherwise stored by the processor system 120. For example, the vision information 204 may be temporally indexed. Thus, the frame selector engine 304 may obtain vision information from the queue or other data storage element. In some embodiments, the frame selector engine 304 may obtain 12, 14, 16, and so on, frames (e.g., vision information associated with 12, 14, or 16-time stamps at which images were taken) spread over the previous 3, 5, 7, 9, seconds. In some embodiments, these frames may be evenly spaced part in time over the previous time period. While description of frames is included herein, as may be appreciated the feature maps associated with image frames taken at a particular time, or within short range of times, may be selected by the frame selector engine 304.

Output from the frame selector engine 304 may, in some embodiments, represent a combination of the above-described frames 306A-N. For example, the output may be combined to form a tensor which is then processed by the remainder of the VRU network 210.

For example, the output 306A-N (temporally indexed features). may be provided to a multitude of video modules. In the illustrated example, two video modules 308A-308B are used. The video modules 308A-308B may represent convolutional neural networks, which may cause the processor system 120 to perform three-dimensional convolutions. For example, the convolutions may cause mixing of space and time dimensions. In this way, the video modules 308A-308B may allow for tracking of movement and objects over times. In some embodiments, the video modules may represent attention networks (e.g., spatial attention).

With respect to video module 308A, kinematic information 206 associated with the autonomous vehicle executing the vision-based machine learning model may be input into the module 308A. As described above, the kinematic information 206 may represent one or more of acceleration, velocity, yaw rate, turning information, braking information, and so on. The kinematic information 206 may additionally be associated with each of the frames 306A-N selected by the frame selector engine 304. Thus, the video module 308A may encode this kinematic information 206 for use in determining, as an example, velocity of objects about the autonomous vehicle. With respect to the VRU network 210, the velocity may represent allocentric velocity.

The VRU network 210 includes heads 310, 312, to determine different information associated with objects. For example, head 310 may determine velocity associated with VRU objects while head 312 may determine position information and so on as illustrated in FIG. 2.

In general, the vision-based machine learning model described herein may include a multitude of trunks or heads. As known by those skilled in the art, these trunks or heads (collectively referred to herein as heads) may extend from a common portion of a neural network and be trained as experts in determining specific information. For example, a first head may be trained to output respective velocities of objects positioned about a vehicle. As another example, a second head may be trained to output particular signals which describe features, or information, associated with the objects. Example signals may include whether a nearby vehicle has a door open, whether a nearby vehicle has its brake lights on, whether a pedestrian is in a cross-walk, and so on.

In addition to being experts in specific information, the separation into different heads allows for piecemeal training to quickly incorporate new training data. As new training information is obtained, portions of the machine learning model which would most benefit from the training information may be quickly updated. In this example, the training information may represent images or video clips of specific real-world scenarios gathered by vehicles in real-world operation. Thus, a particular head or heads may be trained, and the weights included in these portions of the network may be updated. For example, other portions (e.g., earlier portions of the network) may not have weights updated to reduce a training time and time to updating end-user autonomous vehicles.

In some embodiments, training data which is directed to one or more of the heads may be adjusted to focus on those heads. For example, images may be masked (e.g., loss masked) such that only certain pixels of the images are supervised while otherwise are not supervised. In this example, certain pixels may be assigned a value of zero while other pixels may maintain their values or be assigned a value of one. Thus, if training images depict a rarely seen object (e.g., a relatively new form of vehicle) or signal (e.g., a vehicle driving with a passenger door open) then the training images may optionally be masked to focus on that object or signal. During training, the error generated may be used to train for the loss in the pixels which a labeler has associated with the object or signal. Thus, only a head associated with this type of object or signal may be updated.

To ensure that sufficient training data is obtained, the autonomous vehicles may optionally execute classifiers which are triggered to obtain images which satisfy certain conditions. For example, vehicles operated by end-users may automatically obtain training images which depict, for example, tire spray, rainy conditions, snow, fog, fire soke, and so on. Further description related to use of classifiers is described in U.S. Patent Pub. No. 2021/0271259 which is hereby incorporated herein by reference in its entirety as if set forth herein.

Figure 3B:
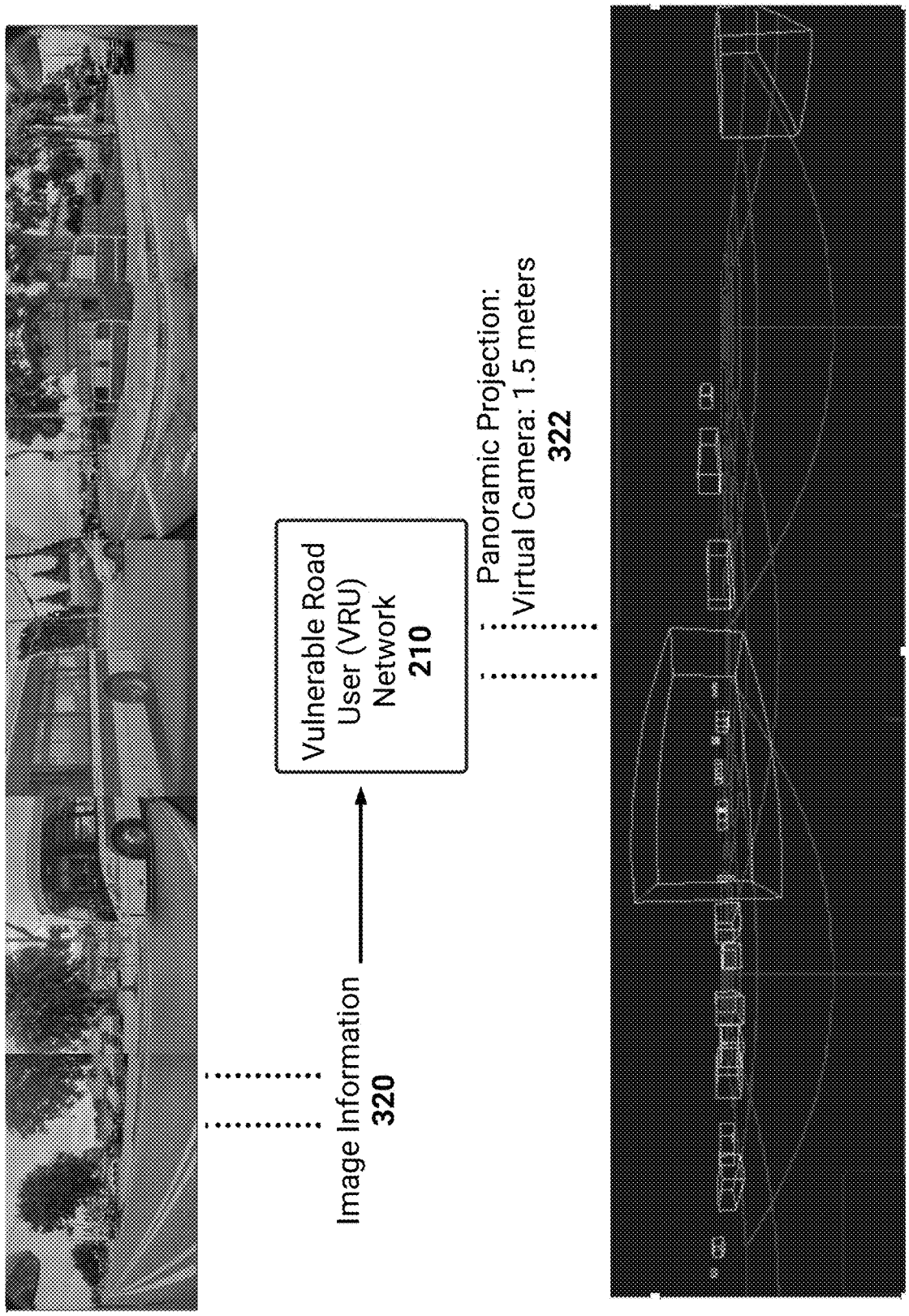
FIG. 3B is a block diagram illustrating an example panoramic view associated with a virtual camera.

FIG. 3B is a block diagram illustrating an example panoramic view associated with a virtual camera. In the illustrated example, image information 320 is being received by the processor system 120 executing the VRU network 210. As described in FIG. 3A, the processor system 120 maps information included in the image information 320 into a virtual camera space. For example, a projection view (e.g., a panoramic projection) 322 is included in FIG. 3B. In some embodiments, and as described above, the projection view may be generated by the VRU network 210.

Figure 4A:
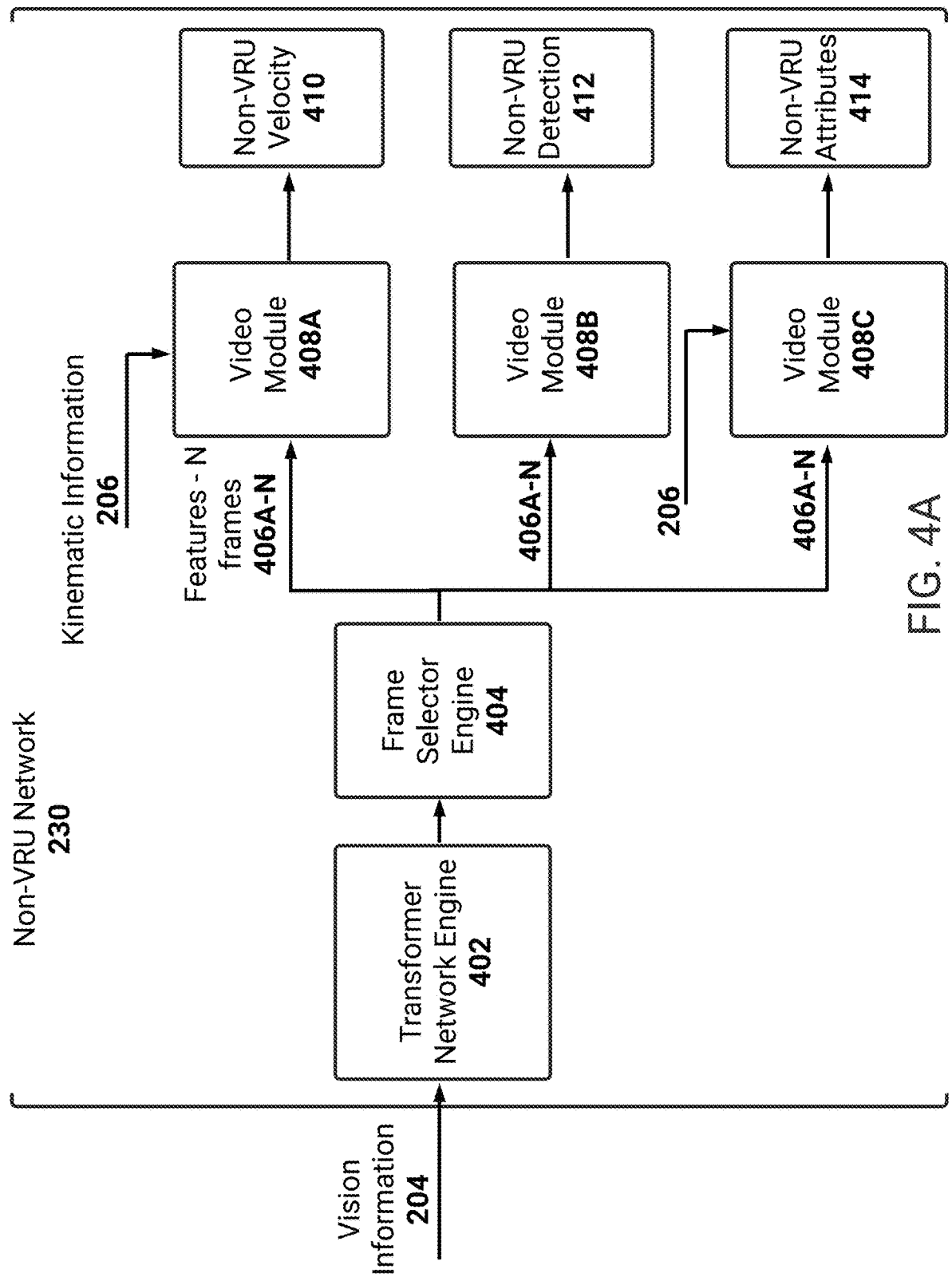
FIG. 4A is a block diagram of the non-VRU branch.

FIG. 4A is a block diagram of the non-VRU network 230. In contrast to the VRU branch 210, the non-VRU network 230 may be trained to focus on, for example, vehicles which are depicted in images obtained from image sensors positioned about an autonomous vehicle.

Similar to the description of FIG. 3A, vision information 204 from the backbone networks is received as input to the non-VRU network 230. A transformer network engine 402 receives the vision information 204 as input. In some embodiments, the transformer network engine 402 is trained to project the information 204 into a virtual camera space (e.g., vector space). For example, during training the non-VRU network 230 may be trained to associate objects detected in images as being positioned within the virtual camera space. As may be appreciated, this is optionally in contrast to FIG. 3A in which a projection engine is utilized. The virtual camera space may be associated with a virtual camera positioned 15 meters, 20 meters, 22 meters, and so on, above the autonomous vehicle.

In some embodiments, the vector space may be warped by the non-VRU network 230 such that portions of the three-dimensional vector space are enlarged. For example, objects depicted in a view of a real-world environment as seen by a camera positioned at 15 meters, 20 meters, 22 meters, and so on, may be warped by the non-VRU network 230. The vector space may be warped such that portions of interest may be enlarged or otherwise made more prominent. For example, the center of the output vector space may be enlarged while sides may be made smaller. The sides, as an example, may represent the upper, lower, left, and right portions of the vector space. Thus, in some embodiments the vector space may be warped similar to that of a lens being positioned in front of the virtual camera. In some embodiments, one or more variables associated with the warping may be hyperparameters selected for use in the non-VRU network 230. Similar to the above description regarding training, the warping may be effectuated using training data where the labeled output is object positions which have been adjusted according to the warping. Thus, the loss function(s) associated with training the non-VRU network 230 may cause the warping.

The warping described herein, for example with respect to the above and for the VRU network, may advantageously allow for computing resources to be focused on portions of a real-world environment which are expected to be more relevant. For example, additionally computing power may be focused on frontal views which can lead to enhanced accuracy in object detection, velocity determination, and so on.

A frame selector engine 404 receives output from the transformer network engine 402 as input. As described above, the engine 404 may select vision information from a queue (e.g., a temporally indexed queue). For example, the selected vision information may represent frames spread apart in time from within a threshold period of time. In some embodiments, exponential striding may be utilized such that frames may be selected more rapidly. This increase in frame rate may optionally be based on a speed at which the autonomous vehicle is moving or average speeds of objects proximate to the autonomous vehicle.

Similar to FIG. 3A, video modules 408A-408C receive output from the frame selector engine 404. These video modules 408A-408C may apply three-dimensional convolutions as described herein. Optionally, the video modules 408A-408C may represent attention networks. Kinematic information 206 may be used by certain of the video modules. For example, video modules 408A, 408C, which are associated with velocity and attributes (e.g., signals) may receive kinematic information 206 as input.

Heads 410-414 may then determine output as illustrated in FIG. 2.

Figure 4B:
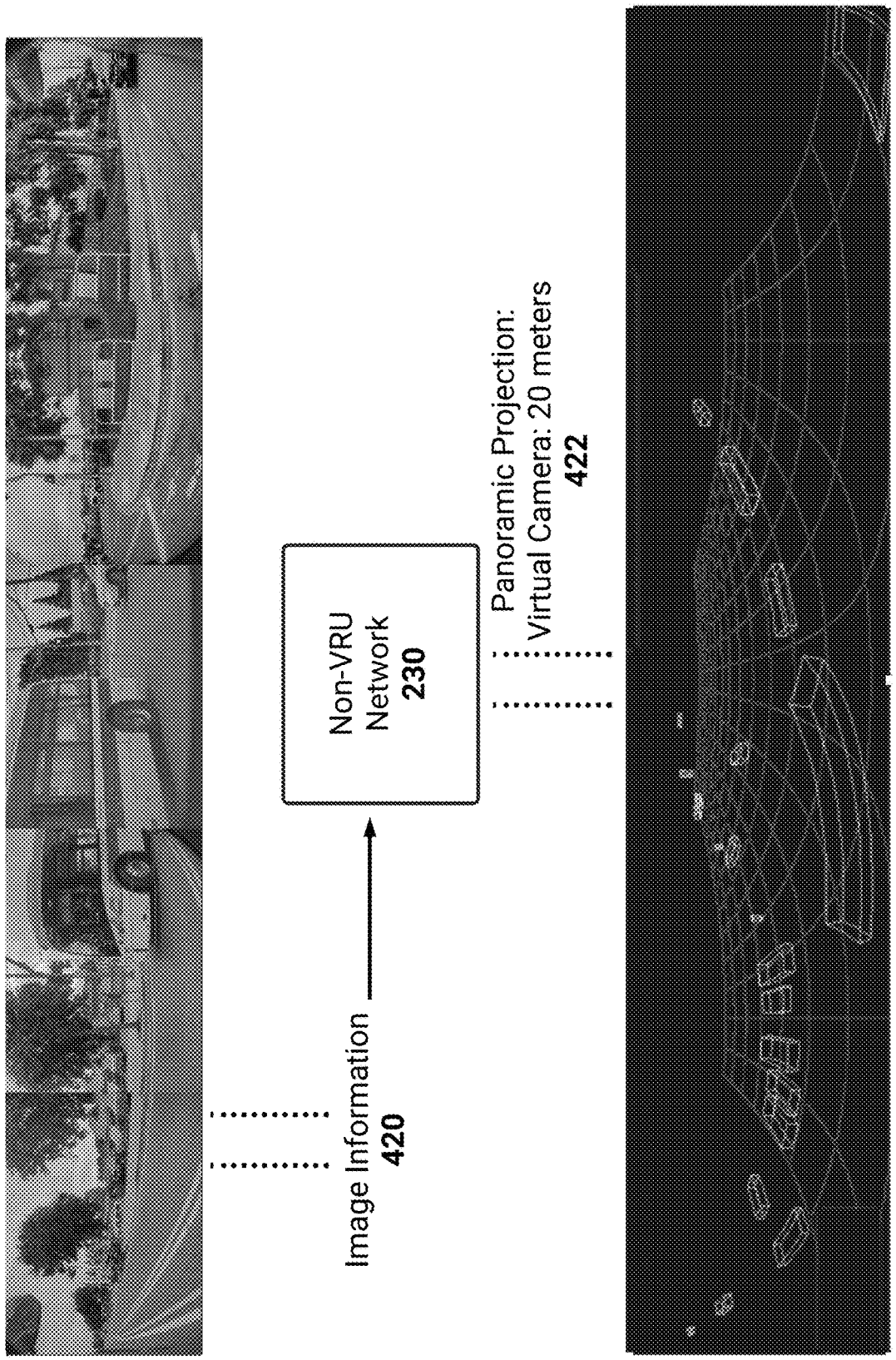
FIG. 4B is a block diagram illustrating an example periscope view associated with a virtual camera.

FIG. 4B is a block diagram illustrating an example periscope view associated with a virtual camera. In the illustrated example, image information 420 is being received by the processor system 120. As described in FIG. 4A, the processor system 120 maps information included in the image information 420 into a virtual camera space. For example, a projection view (e.g., a periscope projection) 422 is included in FIG. 4B.

Figure 5:
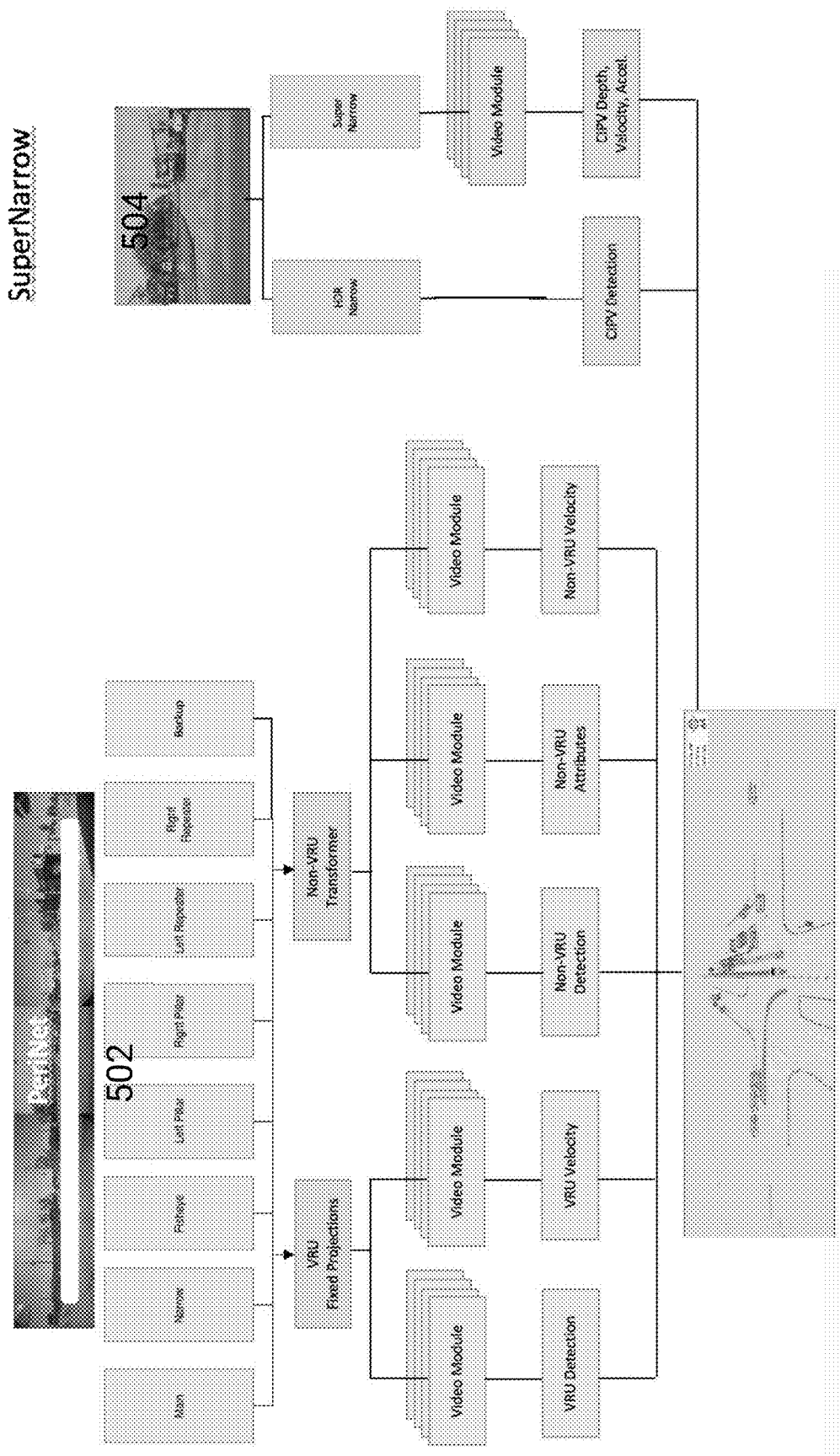
FIG. 5 is a block diagram of the example vision-based machine learning model used in combination with a super narrow machine learning model.

FIG. 5 is a block diagram of the example vision-based machine learning model 502 used in combination with a super narrow machine learning model 504. The super narrow machine learning model 504 may use information from one or more of the front image sensors. Similar to the vision-based model 502, the super narrow model 504 may identify objects, determine velocities of objects, and so on. To determine velocity, in some embodiments time stamps associated with image frames may be used by the model 504. For example, the time stamps may be encoded for use by a portion of the model 504. As another example, the time stamps, or encodings thereof, may be combined or concatenated with tensor(s) associated with the input images (e.g., feature map). Optionally, kinematic information 206 may be used. In this way, the model 504 may learn to determine velocity and/or acceleration.

The super narrow machine learning model 504 may be used to determine information associated with objects within a threshold distance of the autonomous vehicle. For example, the model 504 may be used to determine information associated with a closest in path vehicle (CIPV). In this example, the CIPV may represent a vehicle which is in front of the autonomous vehicle. The CIPV may also represent vehicles which are to a left and/or right of the autonomous vehicle. As illustrated, the model 504 may include two portions with a first portion being associated with CIPV detection. The second portion may also be associated with CIPV depth, acceleration, velocity, and so on. In some embodiments, the second portion may use one or more video modules as described herein. The video module may obtain 12 frames spread substantially equally over the prior 6 seconds. In some embodiments, the first portion may also use a video module.

Optionally, the output of these models may be combined or compared. For example, the super narrow model may be used for object (e.g., non-VRU objects) traveling in a same direction which are within a threshold distance of the autonomous vehicle described herein. Thus, velocity may be determined by the model 504 for these objects.

Example Flowchart

Figure 6:
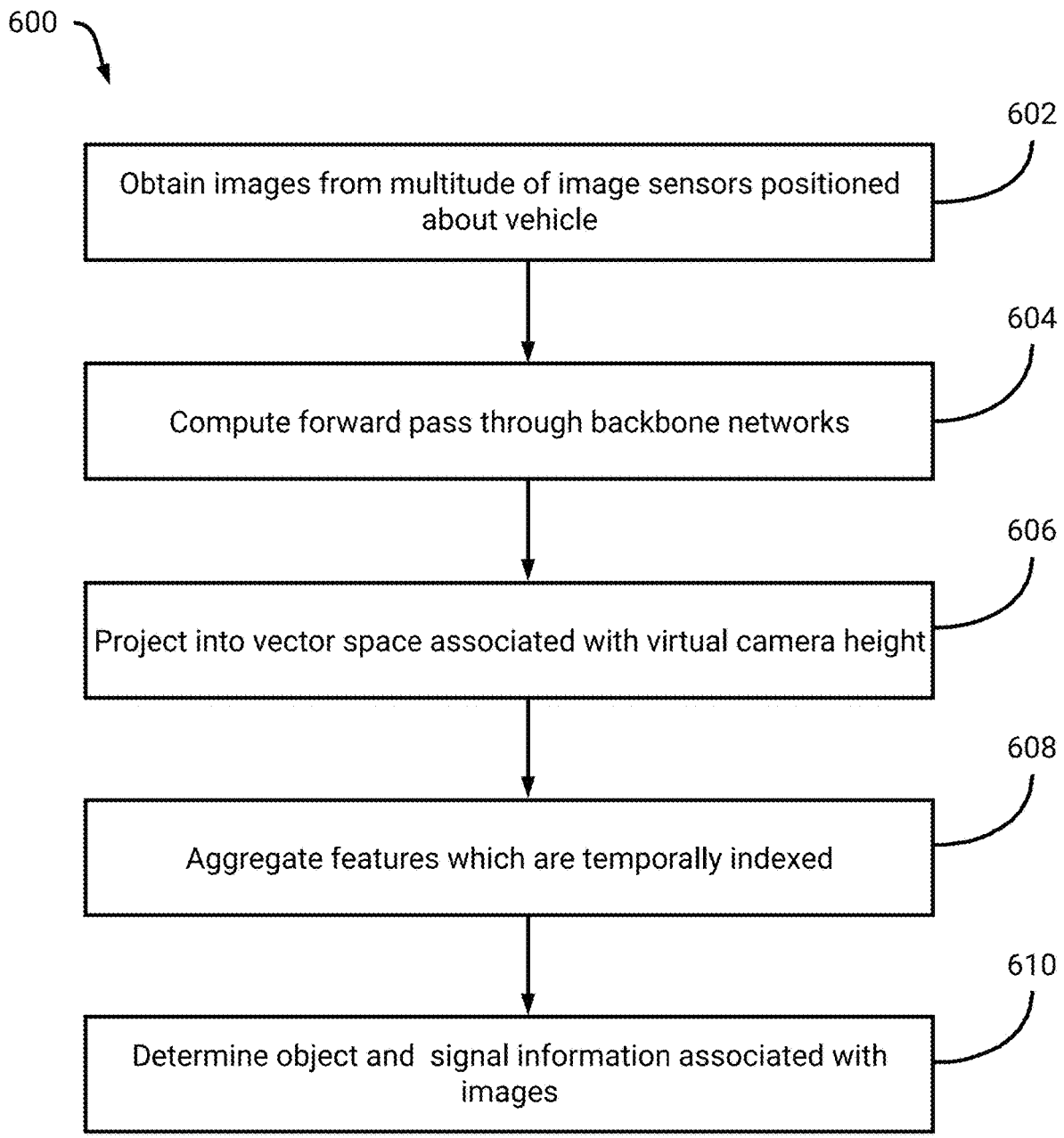
FIG. 6 is a flowchart of an example process for identifying VRU and non-VRU objects positioned about an autonomous or semi-autonomous vehicle using a vision-based machine learning model.

FIG. 6 is a flowchart of an example process 600 for identifying VRU and non-VRU objects positioned about an autonomous or semi-autonomous vehicle using a vision-based machine learning model. For convenience, the process 600 will be described as being performed by a system of one or more processors (e.g., the processor system 120).

At block 602, the system obtains images from multitude of image sensors positioned about a vehicle. As described above, there may be 7, 8, 10, and so on, image sensors used to obtain images. At block 604, the system computes a forward pass-through backbone networks. The backbone networks may represent convolutional neural networks which optionally pre-process the images (e.g., rectify the images, crop the images, and so on). The output of the backbone networks may represent features (e.g., multi-scale features).

At block 606, the system projects features determined from the images into vector spaces associated with respective virtual cameras. With respect to non-VRU objects, the system maps the information into a periscope space. For example, the periscope space may position objects as would be seen by a camera facing substantially forward which placed less than 25 meters, 20 meters, 15 meters, and so on, and greater than 1.5 meters, 2 meters, 3 meters, and so on, above a vehicle. With respect to VRU objects, the system maps the information into a panoramic space. For example, the panoramic space may position objects as would be seen by a camera facing substantially forward which is placed less than 3 meters, 2 meters, 1.5 meters, and so on, above a vehicle. While the periscope and panoramic views are described as positioning objects as would be seen by a camera facing forward, as may be appreciated the views may encompass objects positioned 360 degrees about the vehicle (e.g., the azimuth may encompass between 0 and 360 degrees with respect to an example spherical coordinate system). Additionally, and as noted above, the altitude, or polar angle, encompassed (e.g., with example reference to a spherical coordinate system) may be between 0 and 90 degrees, 20 and 45 degrees, 15 and 70 degrees, and so on.

At block 608, the system aggregates features which are temporally indexed. The system can compute three-dimensional convolutions based on a multitude of information which is spread across time (e.g., the aggregated features). In this way, objects may be tracked over time. At block 610, the system determines object and signal information associated with images. As described in FIG. 2, the system outputs object and signal information for use in autonomous driving.

In some embodiments, the information (e.g., the outputs described herein) determined by the machine learning model described herein may be presented in a display of the vehicle. For example, the information may be used to inform autonomous driving (e.g., used by a planning and/or navigation engine) and optionally be presented as a visualization for a driver or passenger to view. In some embodiments, the information may be used only as a visualization. For example, the driver or passenger may toggle an autonomous mode off. The visualization may also represent a rendering based on the information. For example, three-dimensional graphics of objects (e.g., vehicles, pedestrians, optionally performing actions based on the signals or information described herein) may be rendered based on positional information, velocity information, signal information, and so on, determined by the machine learning model.

Vehicle Block Diagram

Figure 7:
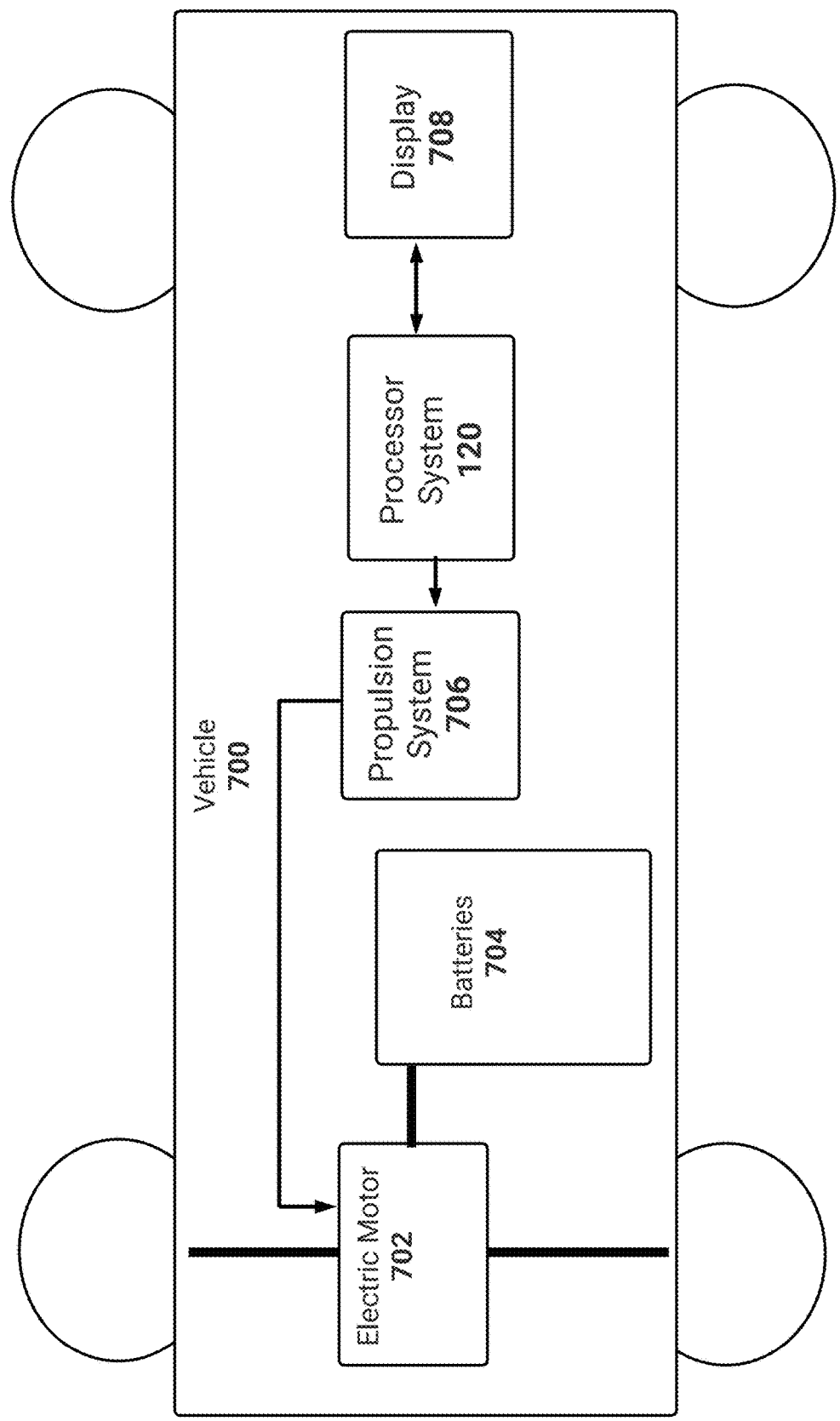
FIG. 7 is a block diagram illustrating an example vehicle which includes the example processor system.

FIG. 7 illustrates a block diagram of a vehicle 700 (e.g., vehicle 100). The vehicle 700 may include one or more electric motors 702 which cause movement of the vehicle 700. The electric motors 702 may include, for example, induction motors, permanent magnet motors, and so on. Batteries 704 (e.g., one or more battery packs each comprising a multitude of batteries) may be used to power the electric motors 702 as is known by those skilled in the art.

The vehicle 700 further includes a propulsion system 706 usable to set a gear (e.g., a propulsion direction) for the vehicle. With respect to an electric vehicle, the propulsion system 706 may adjust operation of the electric motor 702 to change propulsion direction.

Additionally, the vehicle includes the processor system 120 which processes data, such as images received from image sensors 102A-102F positioned about the vehicle 700. The processor system 120 may additionally output information to, and receive information (e.g., user input) from, a display 708 included in the vehicle 700. For example, the display may present graphical depictions of objects (e.g., VRU and/or non-VRU objects) positioned about the vehicle 700.

OTHER EMBODIMENTS

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and engines described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A method implemented by a vehicle processor system, the method comprising:
    obtaining images from a multitude of image sensors positioned about a vehicle;
    determining features associated with the images, wherein the features are output based on a forward pass through a first portion of a machine learning model;
    projecting, based on a second portion of the machine learning model, the features into a vector space associated with a virtual camera at a particular height;
    aggregating, based on a plurality of video modules, the projected features with other projected features associated with prior images; and
    determining, based on a plurality of heads of the machine learning model, a plurality of objects positioned according to the virtual camera,
    wherein the machine learning model includes a first and a second branch, and wherein the first branch is associated with the virtual camera at the particular height and the second branch is associated with a different virtual camera at a different height.

2. The method of claim 1, wherein the first portion includes individual backbone networks for individual image sensors, and wherein each backbone network determines a portion of the features.

3. The method of claim 2, wherein the first branch includes an attention network which receives an aggregated input of the features from the backbone networks.

4. The method of claim 1, wherein the particular height is less than 2 meters.

5. The method of claim 1, wherein the different height is less than 21 meters and greater than 2 meters, wherein the second branch identifies non-vulnerable road user objects, and wherein respective velocities for the non-vulnerable road user objects are determined by the second branch.

6. The method of claim 1, wherein the features are projected into the vector space, and wherein the vector space is warped.

7. The method of claim 6, wherein the vector space is three-dimensional, and wherein the vector space is warped to enlarge a center of the vector space.

8. The method of claim 6, wherein the vector space is three-dimensional, and wherein objects are elongated in the vector space.

9. A system comprising one or more processors and non-transitory computer storage media storing instructions that when executed by the one or more processors, cause the processors to perform operations, wherein the system is included in an autonomous or semiautonomous vehicle, and wherein the operations comprise:
- obtaining images from a multitude of image sensors positioned about a vehicle;
- determining features associated with the images, wherein the features are output based on a forward pass through a first portion of a machine learning model;
- projecting, based on a second portion of the machine learning model, the features into a vector space associated with a virtual camera at a particular height;
- aggregating, based on a plurality of video modules, the projected features with other projected features associated with prior images; and
- determining, based on a plurality of heads of the machine learning model, a plurality of objects positioned according to the virtual camera,
- wherein the machine learning model includes a first and a second branch, and wherein the first branch is associated with the virtual camera at the particular height and the second branch is associated with a different virtual camera at a different height.

10. The system of claim 9, wherein the first portion includes individual backbone networks for individual image sensors, and wherein each backbone network determines a portion of the features.

11. The system of claim 10, wherein the first branch includes an attention network which receives an aggregated input of the features from the backbone networks.

12. The system of claim 9, wherein the particular height is less than 2 meters.

13. The system of claim 9, wherein the different height is less than 20 meters and greater than 2 meters.

14. The system of claim 9, wherein the features are projected into the vector space, and wherein the vector space is warped.

15. The system of claim 14, wherein the vector space is three-dimensional, and wherein the vector space is warped to enlarge a center of the vector space.

16. The system of claim 14 wherein the vector space is three-dimensional, and wherein objects are elongated in the vector space.

17. Non-transitory computer storage media storing instructions that when executed by a system of one or more processors which are included in an autonomous or semi-autonomous vehicle, cause the system to perform operations comprising:
- obtaining images from a multitude of image sensors positioned about a vehicle;
- determining features associated with the images, wherein the features are output based on a forward pass through a first portion of a machine learning model;
- projecting, based on a second portion of the machine learning model, the features into a vector space associated with a virtual camera at a particular height;
- aggregating, based on a plurality of video modules, the projected features with other projected features associated with prior images; and
- determining, based on a plurality of heads of the machine learning model using the aggregated projected features and the other projected features, a plurality of objects positioned according to the virtual camera,
- wherein the machine learning model includes a first and a second branch, and wherein the first branch is associated with the virtual camera at the particular height and the second branch is associated with a different virtual camera at a different height.

18. The computer storage media of claim 17, wherein the particular height is less than 2 meters, and wherein the different height is less than 20 meters and greater than 2 meters.

* * * * *